US008814692B2

(12) United States Patent
Konkle

(10) Patent No.: US 8,814,692 B2
(45) Date of Patent: Aug. 26, 2014

(54) SYSTEM AND METHOD FOR PROVIDING INTERACTIVE CONTENT FOR MULTIPLE NETWORKED USERS IN A SHARED VENUE

(75) Inventor: Tim Konkle, El Dorado Hills, CA (US)

(73) Assignee: Lamplight Games, El Dorado Hills, CA (US)

( * ) Notice: Subject to any disclaimer, the term of this patent is extended or adjusted under 35 U.S.C. 154(b) by 336 days.

(21) Appl. No.: 13/090,443

(22) Filed: Apr. 20, 2011

(65) Prior Publication Data

US 2011/0195790 A1    Aug. 11, 2011

Related U.S. Application Data

(63) Continuation of application No. 11/879,868, filed on Jul. 19, 2007, now Pat. No. 7,938,727.

(51) Int. Cl.
*A63F 13/12*    (2006.01)

(52) U.S. Cl.
USPC .......................................................... 463/42

(58) Field of Classification Search
USPC ................................. 463/40, 42, 39
See application file for complete search history.

(56) References Cited

U.S. PATENT DOCUMENTS

| | | | |
|---|---|---|---|
| 4,477,069 A | 10/1984 | Crudgington | |
| 4,976,438 A | 12/1990 | Tashiro et al. | |
| 5,215,464 A | 6/1993 | Marshall et al. | |
| 5,618,045 A | 4/1997 | Kagan et al. | |
| 5,835,715 A | 11/1998 | Dahl | |
| 6,257,982 B1 | 7/2001 | Rider et al. | |
| 6,346,045 B2 | 2/2002 | Rider et al. | |
| 6,363,075 B1 | 3/2002 | Huang et al. | |
| 6,470,180 B1 | 10/2002 | Kotzin et al. | |
| 6,629,129 B1 | 9/2003 | Bookspan et al. | |
| 6,760,595 B2 * | 7/2004 | Inselberg | 455/517 |
| 6,766,374 B2 | 7/2004 | Trovato et al. | |
| 6,860,810 B2 | 3/2005 | Cannon et al. | |
| 7,056,217 B1 | 6/2006 | Pelkey et al. | |
| 7,092,670 B2 | 8/2006 | Tanaka et al. | |
| 7,124,372 B2 | 10/2006 | Brin | |
| 7,169,052 B2 | 1/2007 | Beaulieu et al. | |
| 7,203,665 B2 | 4/2007 | Donner | |
| 7,240,093 B1 | 7/2007 | Danieli et al. | |
| 7,278,920 B1 | 10/2007 | Klamer et al. | |
| 7,280,975 B1 | 10/2007 | Donner | |
| 7,287,052 B2 | 10/2007 | Chen et al. | |
| 7,344,084 B2 | 3/2008 | DaCosta | |

(Continued)

OTHER PUBLICATIONS

U.S. Appl. No. 12/009,368, Office Action, Jan. 18, 2012.

(Continued)

*Primary Examiner* — Arthur O Hall
*Assistant Examiner* — Allen Chan
(74) *Attorney, Agent, or Firm* — Kunzler Law Group

(57) ABSTRACT

A computer-implemented system and method for providing interactive content for multiple networked users in a shared venue. In a particular embodiment, the system includes a game server, a display system in data communication with the game server, the display system including a shared screen, and a plurality of game pads in data communication with the game server, each game pad including a local game pad display device and a plurality of input devices to convey command selections to the game server, each game pad including functionality to initiate a game, at least a portion of the game being displayed on both the shared screen and the local game pad display device.

20 Claims, 30 Drawing Sheets

(56) References Cited

U.S. PATENT DOCUMENTS

| | | |
|---|---|---|
| 7,458,894 B2 | 12/2008 | Danieli et al. |
| 7,518,501 B2 | 4/2009 | Huston |
| 7,636,783 B2 | 12/2009 | Heutchy et al. |
| 7,796,155 B1 | 9/2010 | Neely et al. |
| 7,853,474 B2 | 12/2010 | Ullah |
| 7,881,702 B2 | 2/2011 | Heyworth et al. |
| 7,938,727 B1 | 5/2011 | Konkle |
| 7,983,611 B2 | 7/2011 | Rao |
| 2001/0027128 A1 | 10/2001 | Rider et al. |
| 2002/0023265 A1 | 2/2002 | Metcalf |
| 2003/0036428 A1 | 2/2003 | Aasland |
| 2005/0071481 A1 | 3/2005 | Danieli |
| 2005/0245317 A1 | 11/2005 | Arthur et al. |
| 2006/0046849 A1* | 3/2006 | Kovacs ............... 463/39 |
| 2006/0068917 A1* | 3/2006 | Snoddy et al. ............ 463/42 |
| 2006/0111186 A1 | 5/2006 | Hattori |
| 2007/0033419 A1 | 2/2007 | Kocher et al. |
| 2007/0105613 A1* | 5/2007 | Adams et al. ............. 463/16 |
| 2007/0111794 A1 | 5/2007 | Hogan et al. |
| 2007/0150368 A1 | 6/2007 | Arora et al. |
| 2008/0102954 A1 | 5/2008 | Schueller |
| 2008/0139167 A1 | 6/2008 | Burgess |
| 2008/0184127 A1 | 7/2008 | Rafey et al. |
| 2008/0220878 A1 | 9/2008 | Michaelis |
| 2008/0263446 A1 | 10/2008 | Altberg et al. |
| 2008/0268931 A1 | 10/2008 | Alderucci et al. |
| 2009/0089379 A1 | 4/2009 | Pegg |
| 2009/0093300 A1 | 4/2009 | Lutnick et al. |
| 2009/0111458 A1 | 4/2009 | Fox et al. |
| 2009/0186700 A1 | 7/2009 | Konkle |
| 2011/0088071 A1 | 4/2011 | Yerli |
| 2011/0145863 A1 | 6/2011 | Alsina et al. |
| 2011/0159962 A1 | 6/2011 | Yerli |
| 2011/0185437 A1 | 7/2011 | Tran et al. |
| 2011/0223996 A1 | 9/2011 | Yerli et al. |

OTHER PUBLICATIONS

U.S. Appl. No. 12/009,368 Office Action dated Dec. 5, 2013.

* cited by examiner

SYSTEM AND METHOD FOR PROVIDING INTERACTIVE CONTENT FOR MULTIPLE NETWORKED USERS IN A SHARED VENUE

PRIORITY APPLICATION

This is a continuation patent application of patent application, Ser. No. 11/879,868; filed Jul. 19, 2007 now U.S. Pat. No. 7,938,727 by the same applicant. This present patent application draws priority from the referenced co-pending patent application. The entire disclosure of the referenced co-pending patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2011, Tim Konkle. All Rights Reserved.

BACKGROUND

1. Technical Field

This disclosure relates to methods and systems supporting multiple networked users in a shared venue.

2. Related Art

The seats of a motion picture theater or similar entertainment facility could be equipped with individual user stations, each having its own games and its own video screen, such as the arrays of user stations that are found in conventional video game arcades. However, the enjoyment of the game is heightened by a large screen, and is enriched by sharing the collective reactions of a large number of other concurrent users, playing a single or multiple interactive games.

Existing popular video games include those where only a single user can play at a time, and others that allow two or several assembled users to play simultaneously. Neither of these types of games can be played concurrently by a large number of multiple users.

Recently, a third variety of video game has appeared which allows a large number of multiple users to play concurrently, but from remote user stations that are linked by means of a local area network or the Internet. The users are not all assembled together so there is no opportunity to share the experience of each other's reactions.

Other video game systems and facilities have also been proposed that permit play by multiple users. Rider et al. (U.S. Pat. No. 6,257,982), for example, discloses a system and facility for video games with a large number of user stations and a single screen upon which the video game images are displayed visible from each of the user stations. The system allows for simultaneous use by a large number of users who share the experience of playing the game and their combined reactions together. The system is particularly suited for installation in a motion picture theater or similar entertainment facility.

Crudgington, Jr. (U.S. Pat. No. 4,477,069), for example, discloses a futuristic styled theatre which contains a plurality of game consoles, one for each player. All players participate in the same performance which is controlled by a master computer but each player has his own monitor to view the game.

Tashiro et al. (U.S. Pat. No. 4,976,438) discloses a system where a number of players are arranged in a circle at individual consoles. The players can simultaneously play a game using a common screen (110) which surrounds the players. The apparatus contains a wide variety of mechanical systems to move the seats used by the players.

Marshall et al. (U.S. Pat. No. 5,215,464) discloses a system for law enforcement or military weapons training. Multiple trainees (who are on foot and mobile) interact with a simulated training exercise displayed on a single large video screen. The trainees utilize firearms to shoot an infrared beam at opponents on the screen. The infrared beams are detected by the computer system running the simulation and the system will tire back an infrared beam in the direction of the originating shot. Trainees wear detectors that indicate if they have been hit.

Kagan et al. (U.S. Pat. No. 5,618,045) discloses a system of multiple hand held playing devices that communicate over a wireless LAN to allow multiple players to play the same game. The individual playing devices may also communicate to a large display to show the game scenario.

Dahl (U.S. Pat. No. 5,835,715) discloses a theatre based system for allowing users to make choices as to what content they wish to see on the main screen, sub-screens of the main theatre screen, or a screen in their individual seat computer. The theatre also incorporates a series of robots in front of the screen to simulate an imaginary creature to add to the video presentation.

None of the systems known to the inventor disclose or suggests a gaming system for use in a motion picture theater or similar public venue in which a large number of simultaneous multiple users can share the same game or multiple game experiences together, heightened and enriched by also sharing in the reactions of the total group.

Thus, a system and method for providing interactive content for multiple networked users in a shared venue is needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of an embodiment of the present invention. It will be evident, however, to one of ordinary skill in the art that embodiments may be practiced without these specific details.

Below are described various aspects of systems and methods for providing interactive content for multiple networked users in a shared venue. A system architecture of an example system is illustrated in FIG. 1.

Figure 1:
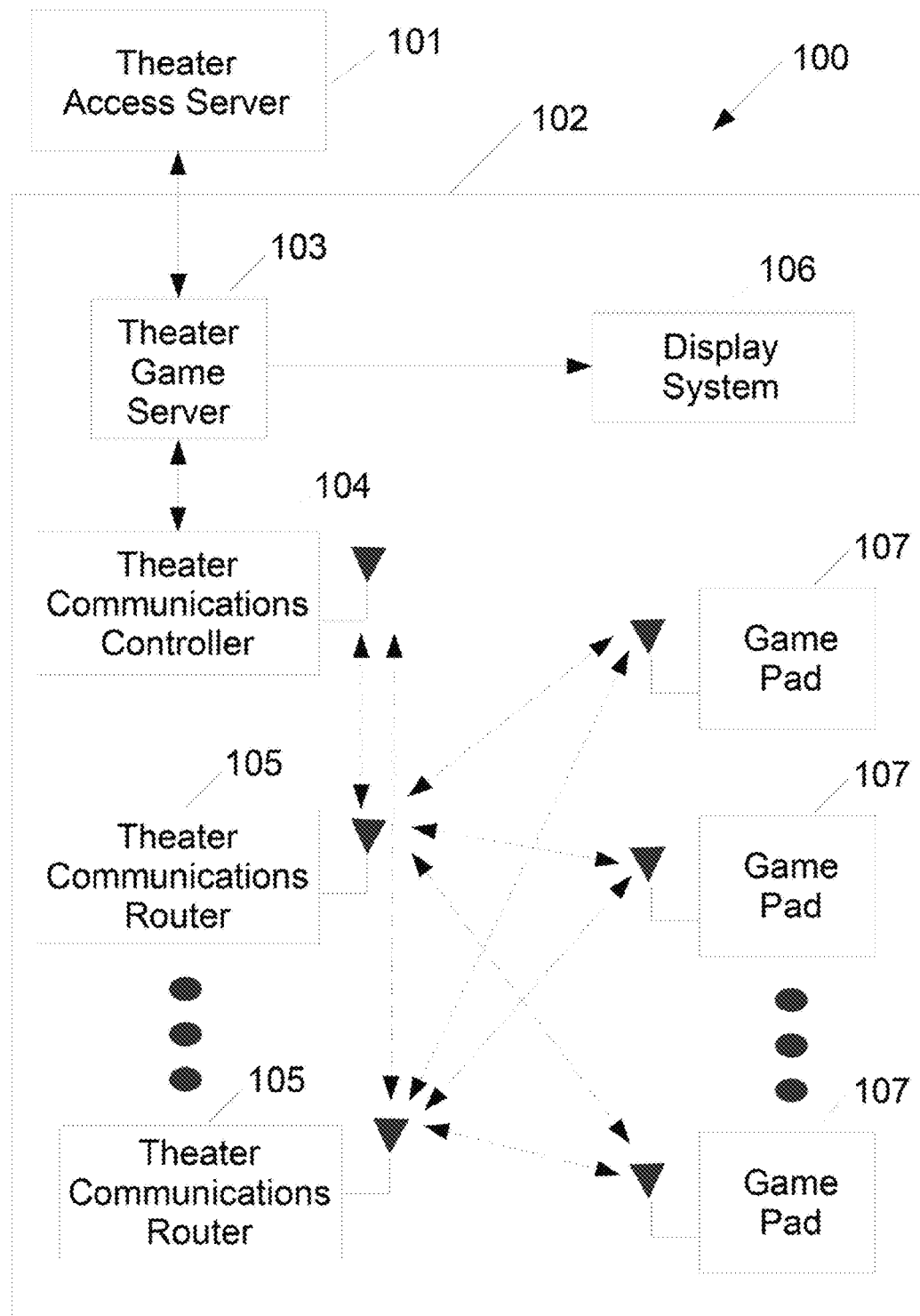
FIG. 1 illustrates an example system of a particular embodiment that provides a wireless theater site with interactive content for multiple networked users in a shared venue.

Referring to FIG. 1, an example system of a particular embodiment provides interactive content for multiple networked users in a shared venue. As described herein, a theater-like gaming area is provided with multiple wireless controllers allowing people within the theater-like gaming area to participate in one or more multimedia experiences, and to possibly connect with multiple other locations. In a particular embodiment, the wireless network is provided within the wireless theater site, while communications between theater sites can be configured as a wired network. As shown in FIG. 1, a wireless theater site 100 includes a theater access server 101 with access to Internet and one or more theater auditoriums 102 which enable web services and multimedia content to be downloaded from secure Internet web servers 301 (shown in FIG. 3). The theater site 100 is typically a public location supporting ticket sales for event sessions (movies, games, presentations, discussions), events themselves, consumers/groups at these events and products/services sold to these customers/groups. In a particular embodiment, the theater access server 101 functions as the local site gateway between remote data services from secure Internet web access/content servers 301 and local systems involved with providing multimedia content, scheduling, ticket sales, advertisement/promotion services, and data on local customers and collectively groups of customers that hold events on theater site 100. The theater auditorium 102 includes an auditorium area. Typically, a theater auditorium is filled with rows of seats with either a projector and large projection screen or large display such as a LCD or plasma display system 106 that connects to a theater game server 103 that has video card(s) to present a composite image to display system 106. Note that Display System 106 may also have multiple physical display devices, e.g. dual screen monitors driven by a computer with dual port video cards, dual video cards, or the like. Conventional computer vendors sell dual/quad display setups. In a particular embodiment, Game Server 103 can be implemented with multiple video cards, such that Game Server 103 can drive multiple (1, 2 or 4) displays/projectors. Similarly, various embodiments can support multiple game servers 103 and display systems 106 in the same auditorium to support multiple multimedia streams and multiple view perspectives. Theater auditorium 102 may also include a wireless network consisting of communications controller 104 and one or more communications routers 105 which provide multimedia content and gather customer input from one or more game pad 107 devices.

The theater game server 103 device pulls multimedia content (movies, videos, games) and data from theater access server 101 to present the multimedia content in a composite video image on display system 106. Theater game server 103 also sends and receives network traffic between game pads 107 as input for events such as games or presentations. Theater game server 103 also peers with other on-site theater game servers 103 via a shared network between theater access server 101 and its networked resources.

Theater Communications Controller 104 can be a radio frequency (RF) communications controller employing local, low power, shared RF communications, such as IEEE 802.11 based WiFi, WiMax, or ZigBee protocols. In a particular embodiment, the auditorium 102 is managed by the communications controller as an access point providing input/output to possibly one or more other RF communication routers and a plurality of wireless game pad 107 devices.

Theater Communications Router 105 can be an RF communications router employing wireless access such as IEEE 802.11 based WiFi, WiMax or ZigBee protocols over multiple low power RF channels. In this manner, data communication between communications controller 104 and game pads 107 can be mediated in a peer to peer, client-server or mesh network topology.

Display System device 106 may consist of a projector and large screen or a large video display such as LCD or plasma, taking a composite image generated from theater game server 103 video card(s) and displaying images on its display screen for a large, shared, common screen for all of the audience in the auditorium area 102.

Game Pad devices 107 allow for local (player) display of images related to either display system 106 multimedia content (e.g. movies or games), player profile data of customer logged into device, group profile data related to customer, or local applications such as theater site 100 provided product and service sales/promotions. Game Pad devices 107 also allow general communication between customers either locally in auditorium area 102, other auditoriums areas in local theater site 100 or remotely through theater game server 103 and out to Internet via theater access server 101 for instant messaging type text chat, text messaging such as SMS (via 3rd party web services), email, or other common Internet protocols.

Figure 2:
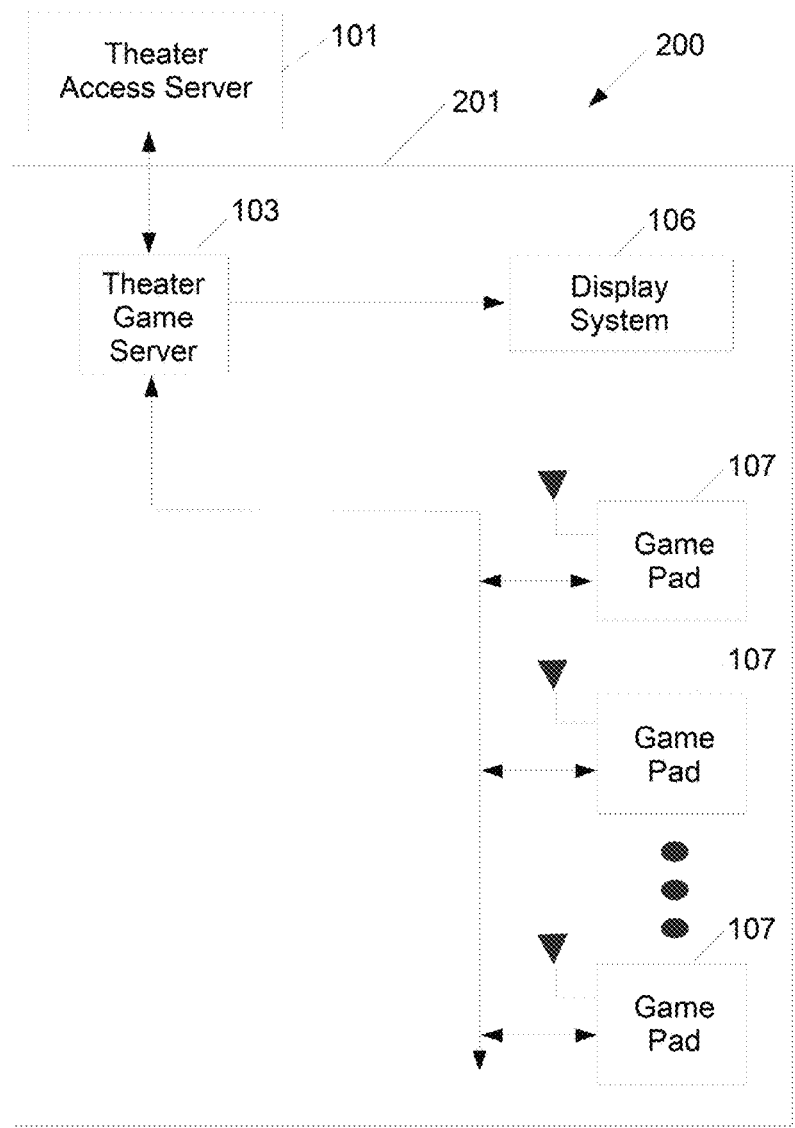
FIG. 2 illustrates an example system of a particular embodiment that provides a wired theater site with interactive content for multiple networked users in a shared venue.

As shown in FIG. 1, a wireless theater site 100 is shown. FIG. 2 illustrates a similar system architecture for a wired theater site. As shown in FIG. 2, the wired embodiment includes the Theater Access Server device 101, Theater Game Server device 103, Display System device 106, and the Game Pad device 107 as described above. Theater Site (wired) 200 is similar to the wireless embodiment 100; however, Theater Site 200 makes use of wired ethernet communication networking (e.g. USB, Firewire, or other data communication protocols may also be used) to facilitate security (versus wireless), greater noise immunity, longer distances between equipment and generally more data bandwidth between theater game server 103 and game pads 107.

Figure 3:
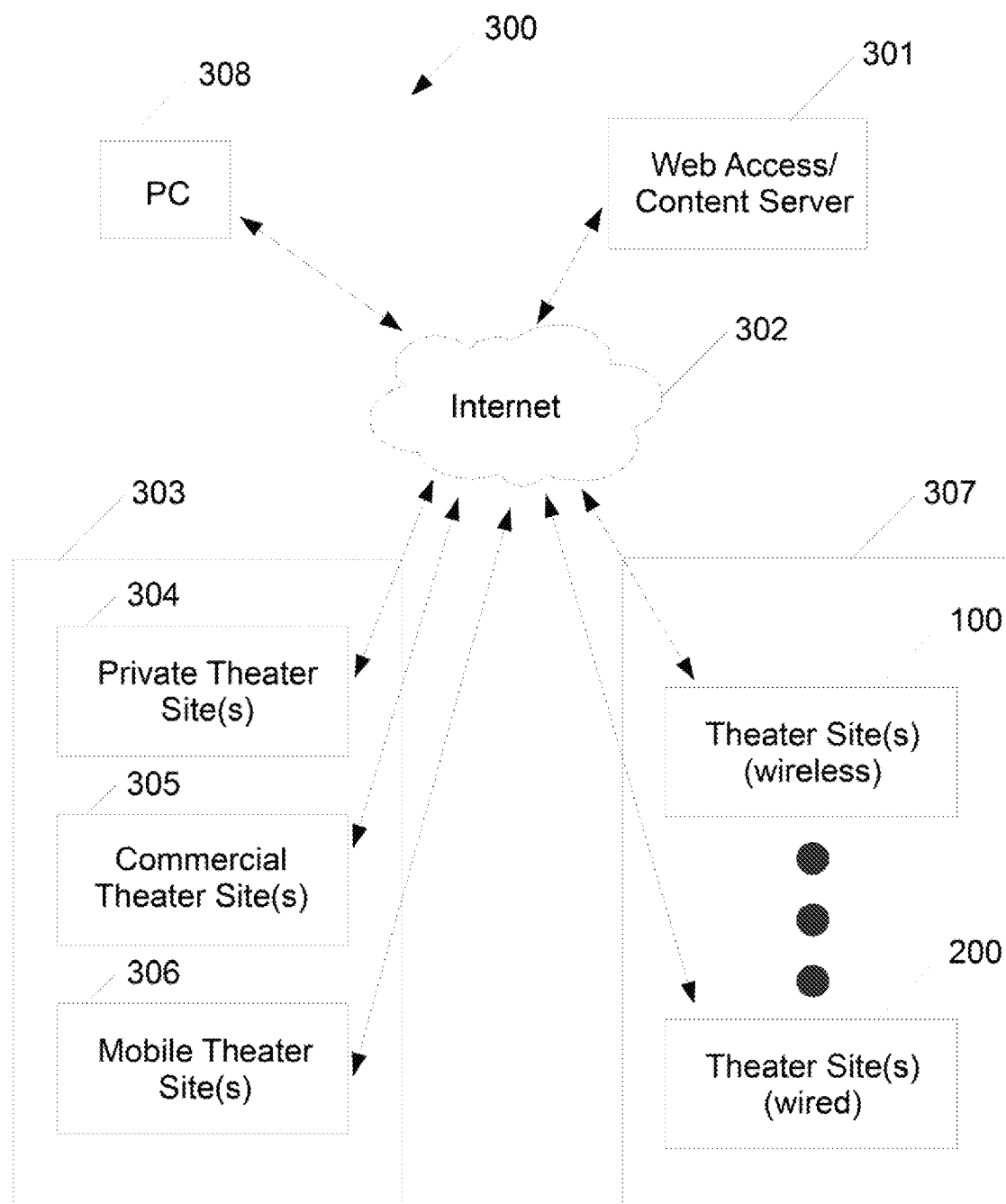
FIG. 3 illustrates a Multi-Theater Site system architecture featuring traditional theaters (chains), home theaters, and commercial sites.

FIG. 3 illustrates a Multi-Theater Site system architecture featuring traditional theaters (chains), home theaters, and commercial sites such as hotels, schools, offices, conference rooms, plus mobile locations such as airplanes and automobiles. The various embodiments described herein enable logically grouping gaming sites, managing content across a network to both wired and wireless players who may be in either homes, theaters or theater-like environments playing a plurality of games with others organized in a community of groups and events exhibiting in a plurality of interactive modalities. As shown in FIG. 3, Theater Sites (wireless) 100 and Theater Sites (wired) 200 can be included in the overall system architecture. The Multi-Theater Site network 300 groups multiple theater sites together, such as theater chains, but classifies sites on a public versus a private basis, where public sites may feature ticket sales where private sites would primarily feature a subscription model instead.

As shown in FIG. 3, Web Access/Content Servers 301 handle both content and management data flow, both in from content producers as well as out to content consumers, both commercial and private. The content may consist of multimedia and games, logical theater chain details, details on theater sites, customers, groups, events, advertisers, promotions and more. The management of correlating events hosted by groups, suggestions/ratings of events by both people and collectively groups, plus schedules of people as customers of future events. The Internet 302 allows a shared medium of communication over well-known open protocols such as HTTP, SSH, VPN, web services (extensions to HTTP and HTTPS), FTP, email and instant messaging or RSS. Web Access/Content Servers 301 and users of personal computers (PC) 308 (e.g. content producers or content consumers) can be accessible via network 302 to Multiple Commercial and Private Theater Sites 303. Multiple Commercial and Private Theater Sites 303 are typically not logically grouped, but include sites such as private home theaters 304, commercial sites 305, and mobile sites 306. Private Theater Site(s) 304 includes theater sites such as 401 (shown in FIG. 4) that are residential sites where no ticket sales would be expected. Instead, these sites can include a log on to a game pad and play from a subscription model service. Individual Commercial Site(s) 305 include theater sites such as hotels, offices, schools and places where either a ticket sales model is used or a subscription model is used. Mobile Theater Sites 306 is a subscription model site without ticket sales that may be an airplane, RV, bus, SUV, boat, or generally a portable/mobile theater-like environment. Commercial Theater Site(s) 307 are typically logically grouped in a plurality of theater chains with sites that can either have subscription or ticket sales models, and can share information, such as movie schedules and group/event details.

Figure 4:
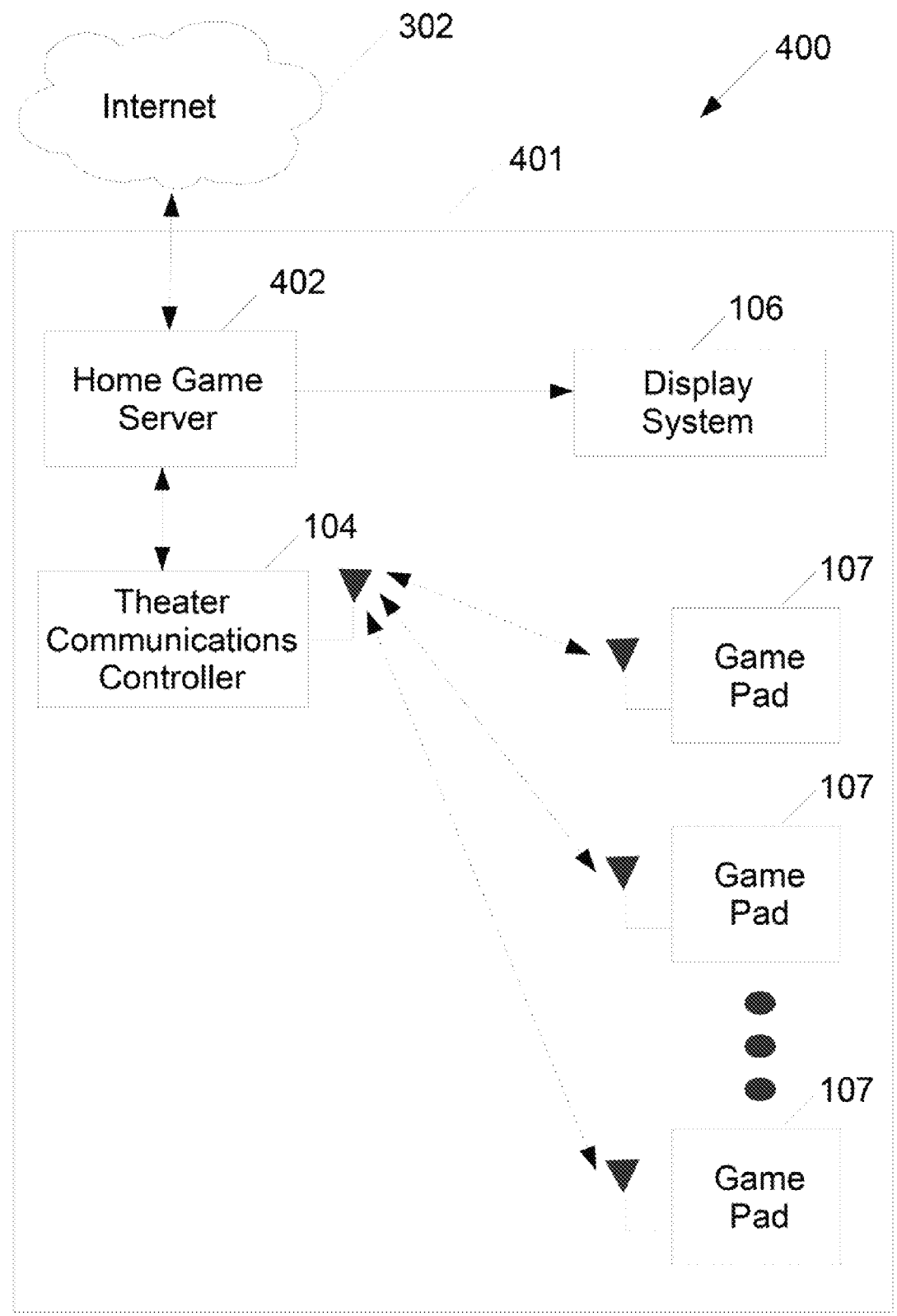
FIG. 4 illustrates a Private Home Theater Site (wireless).

FIG. 4 illustrates a Private Home Theater Site (wireless) 400. As described in various embodiments, the Private Home Theater 400 allows players to wirelessly play one or more multimedia experiences possibly connected to multiple other locations via network 302. Private Home Theater Site (wireless) 400 is a theater site typically without ticket sales and features a direct network connection between the communications controller 104 and game pad 107 devices. As described above, Theater Communications Controller 104 can be a radio frequency (RF) communications controller employing local, low power, shared RF communications, such as IEEE 802.11 based WiFi, WiMax, or ZigBee protocols. The communications controller 104 can act as an access point providing input/output to possibly one or more other RF communication routers and a plurality of wireless game pad 107 devices. Display System device 106 is generally a device such as a television, (LCD, plasma) monitor or projector and screen set-up. Display System device 106 can still feature multiple concurrent multimedia streams, however, size, resolution, merge/divide screen region areas may be optimized; plus, region timeouts may be disabled by customer configuration removing the movie interrupt (uses whole screen) limitation or expectation. The wireless Game Pad device(s) 107 shown in FIG. 4 are described in more detail below. Private Home Theater Auditorium area 401 consists of a home game server 402, network communications controller 104 and multiple game pad 107 devices. Home Game Server device 402 can be similar to a theater game server 103 device configured in software to provide default configuration and services for a home, thereby removing theater management restrictions (e.g. approving events) and multiple auditorium settings. As used herein, the term, 'game server' can be considered to include both theater game server and home game server features. In regard to electronic commerce transactions performed with a particular embodiment in a home setting, home theater sites can be primarily subscription based. In a subscription model, the subscription fee paid by the consumer provides the value offered by the consumer in return for goods and services ordered via the particular embodiment described herein. The subscription model may may include payment options for quota or tokens. In another embodiment, a transactional model may be used, wherein the home game server 402 receives a goods/service order from a consumer and then in real-time accesses the web access/content server 301 via Internet 302 to authenticate the payment for the order from a consumer credit card, credit account, or the like. In this manner, the consumer can use a particular embodiment in a home setting to perform e-commerce transactions and financial transactions. If products/goods are to be delivered to a home site, then transactions may involve third parties; perhaps external to the system via Internet email or the (secure) web. Services and virtual products, such as software items, can be delivered directly to home (e.g. in game virtual player items or information such as business analytics) via a network 302 download.

Figure 5:
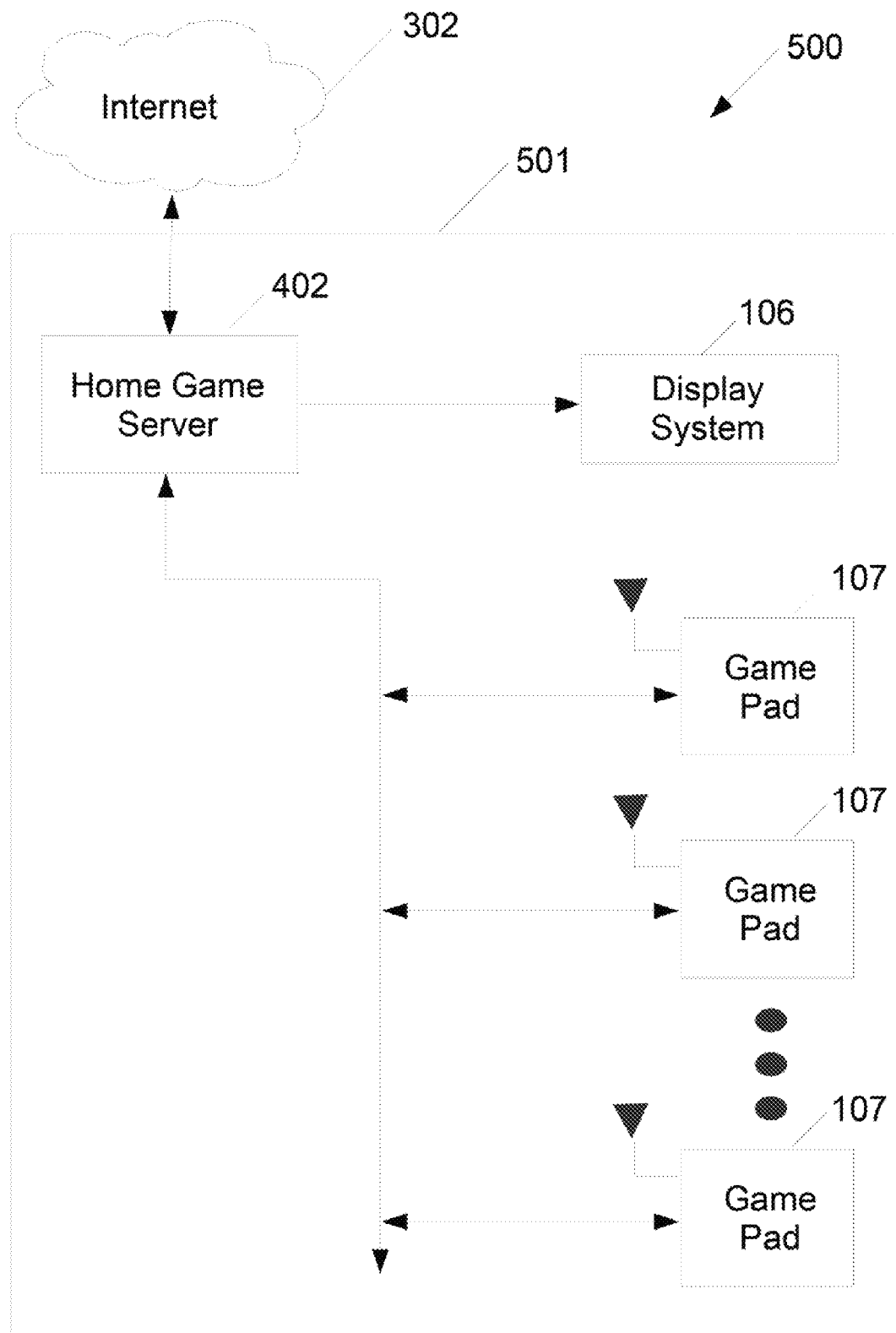
FIG. 5 illustrates a wired Private Home Theater Site.

FIG. 5 illustrates a wired Private Home Theater Site 500. As described in a particular embodiment, the Private Home Theater site 500 allows players to play one or more multimedia experiences and to possibly connect with multiple other locations. Private Home Theater site 500 is similar to Private Home Theater site 400 described above, except the embodiment uses ethernet or USB data connections rather than wireless data connections. Private Home Theater site 500 in a particular embodiment includes a Private Home Theater Auditorium area 501, which includes Display System device 106, wired Game Pad device(s) 107, and Home Game Server device 402. The Private Home Theater Site 500 uses the Internet 302 to communicate with a content server 301.

Figure 6:
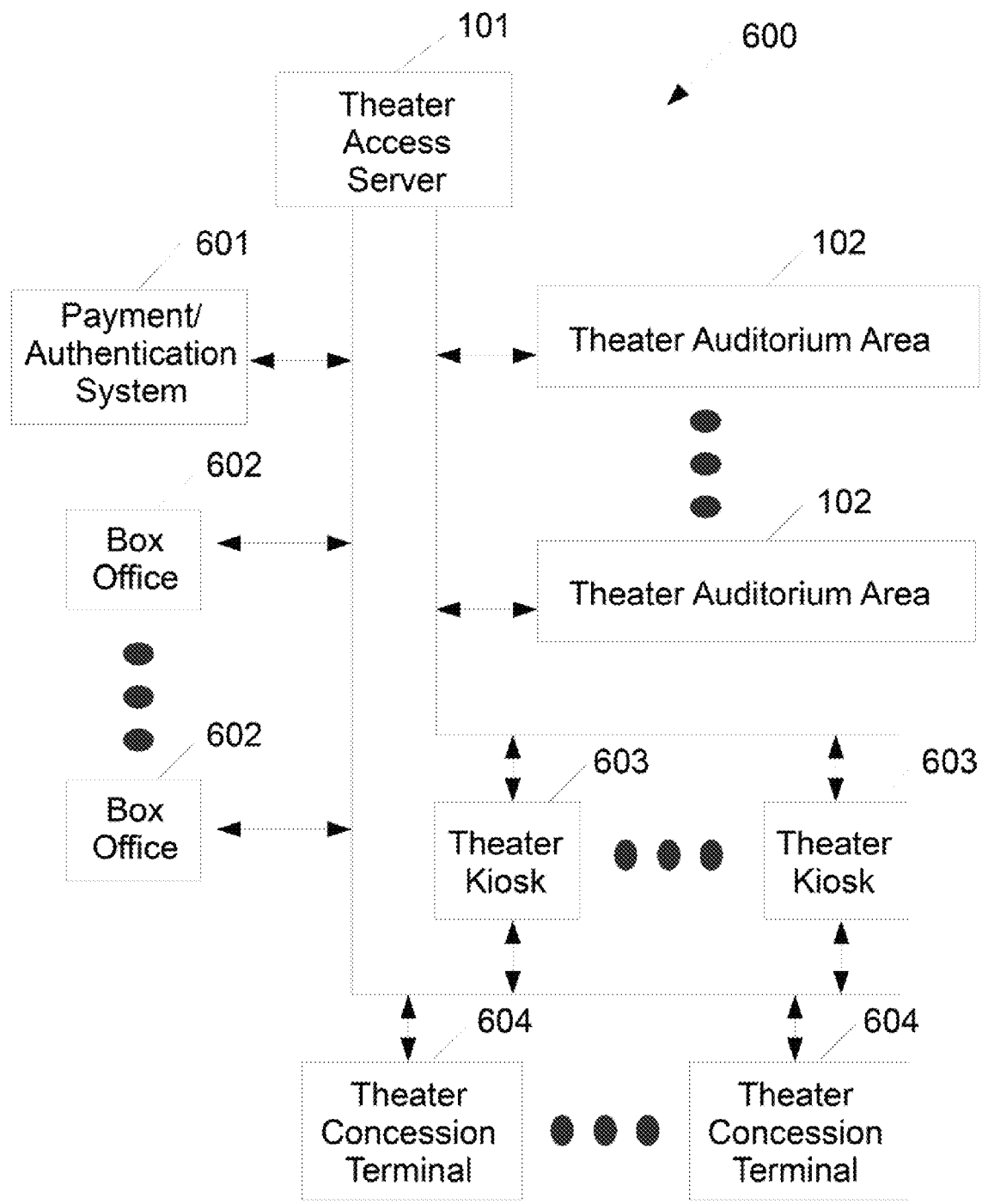
FIG. 6 illustrates a Theater Site with On-Site Event, Product and Service Sales Support.

FIG. 6 illustrates a Theater Site with On-Site Event, Product and Service Sales Support 600. As described in various embodiments, Theater Site 600 provides a system architecture allowing event searches, ticket purchases, wired/wireless remote product/service ordering and delivery. Theater Site with On-Site Event, Product and Service Sales Support 600 includes Auditorium area(s) 102 or 201, and a theater access server 101 with both a customer facing network and a content/product/services based network. The customer facing network includes payment/authentication systems 601, multiple box office 602 devices, multiple theater concession terminals 604, and a bridged connection to multiple theater kiosk(s) 603. The content/product/services based network includes multiple theater auditoriums 102 or 201, and bridged connection to multiple theater kiosk 603 devices. Theater Site Payment/Authorization System device 601 is the credit card/ATM processing device such as a modem with card reader common to retail stores for VISA/Mastercard/bank ATM that facilitates remote authentication, authorization and account debit for funds on behalf of a customer. Ticket Box Office (location/devices) 602 is the theater site location where customers can visually/verbally ask about events and schedules, purchase with cash or credit either tickets or a member magnetic striped card to establish an on-site (or theater chain) cash equivalent account. The box office would for customers/member cards additionally create an account with a globally unique identifier provided from the theater access server 101 via web access/content server 301, and upon event ticket sales, print out session codes for events on tickets that are used to login to game pads 107. Theater Kiosk device 603 has a display and input devices such as keyboard and mouse, card reader (atm/credit or loyalty cash cards) and local network access. The Kiosk device 603 shows movie and game trailer videos, up-coming event schedules, plus allows a customer to search for and buy tickets to events such as game sessions and movies. The kiosk 603 can forward payment authorization and account setup details to the theater access server 101 for a customer, while allowing them to join groups and events, plus print their tickets or schedules. The kiosk 603 can also be used to define a customer's buddy list and group memberships, check on presence/activity of buddy list or fellow group members and send cell phone text messages or email invites for events out to their friends, which is a request routed out to theater access server 101 which forwards the request to web access/content server 301 to either send text message/email directly or use a third party web service. Theater Concession Terminal 604 is basically a personal computer (PC) with card reader (atm/credit/loyalty card) and order printer, but also has software and databases to support logins by either theater staff or management for use in specifying product inventory, creating and running product sales (advertisements) and promotions, plus viewing/auditing customer orders.

Figure 7:
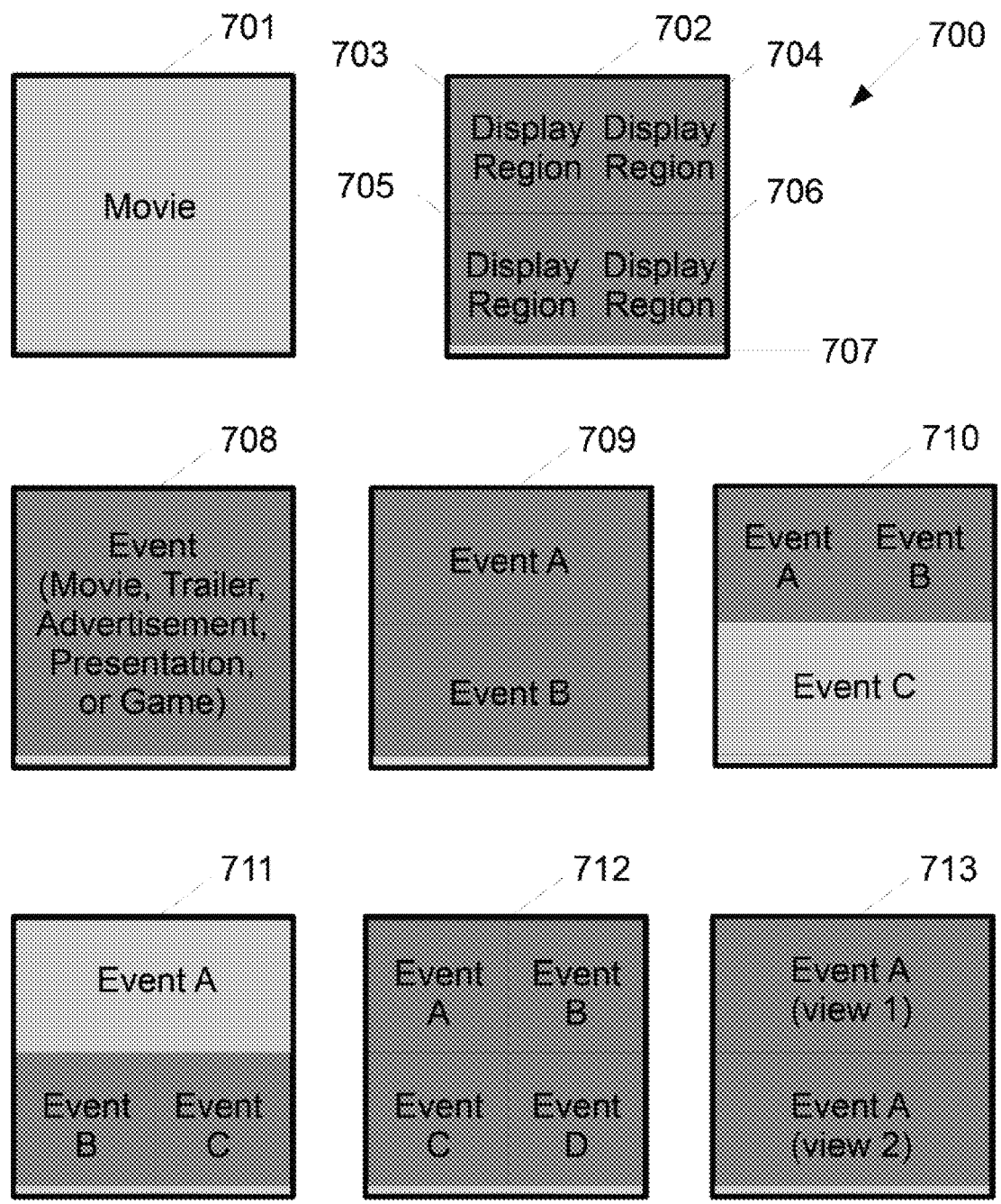
FIG. 7 illustrates a Display Screen Modality.

FIG. 7 illustrates a Display Screen Modality 700. As described in various embodiments, Display Screen Modality 700 illustrates display screen configurations allowing multiple display regions and a status bar region to be displayed where regions can change size, position, and content for multiple participants in multimedia events networked to multiple locations. A separate multimedia stream can be shown in each of the display regions of the display screen modality 700. Further, a multimedia stream in an event (scheduled activity for auditorium location and time/duration) can be different modalities such as passive (image/video/movies) or interactive (interactive videos, games, movies or presentations). Display Screen Modality 700 is configured such that either: 1) the auditorium theater screen is off, 2) the auditorium theater screen is on and showing a movie, or 3) the auditorium theater screen is on and displaying one or more display regions plus a status bar. The large screen may be halved, or quartered into partitions, etc. such that individual multimedia streams can appear in the partitioned regions and customers (or players) who are to interact with those partitioned regions will be shown either by the status bar or their individual game pad 107 device a status indicator (LED, LCD display picture or text, or audio) to let them know which screen region they have joined a session with for interactive input. Display Screen device 701 is configured to show a regular movie without a status bar at the bottom of the screen. The display content is shown at theater site default or normal position, size, and resolution that is compatible for the display content. Display Screen device 702 is controlled by theater game server 103 or home game server 402. Display Screen device 702 can be configured to have multiple display regions and a status bar region. Display Region 703 provides an upper left area that can merge with the area to the right or the whole screen for multimedia content. Display Region 704 provides an upper right area that can merge with the area to the left or the whole screen for multimedia content. Display Region 705 provides a lower left area that can merge with the area to the right or the whole screen for multimedia content. Display Region 706 provides a lower right area that can merge with the area to the left or the whole screen for multimedia content. Status Bar Region 707, located on the bottom, top or sides of the display screen can be used to display theater, event or specific content information. Single Display Region 708 provides a single region using the whole screen for single multimedia content, plus the status bar region 707. Split Display Regions 709 provides two display regions showing two separate multimedia content, plus a status bar region 707. Upper Tri-Region Display 710 provides three multimedia display regions where the upper area of horizontal is split, plus a status bar region 707. On larger screens, this may be a top half screen with several event display region multimedia streams and the upper area split into many similarly sized regions, such as splitting the upper area across its width into 2, 3, 4 or more display regions. Lower Tri-Region Display 711 provides three multimedia display regions where the lower area of horizontal is split, plus a status bar region 707. On larger screens, this may be a the lower half screen with several event display region multimedia streams and the lower area split into many similarly sized regions, such as splitting the lower area across its width into 2, 3, 4 or more display regions. Quad Display Region 712 provides four display regions for multimedia content, plus a status bar region 707. Alternate Views 713 provides display regions that can show alternate views of the same multimedia content, such as head-to-head games where a multimedia stream content model is the same, but the view perspective for each region is different (e.g. chess board view over white piece side and black piece side). In this case, the player(s) associated with a given view or display region has their input from game pad 107 related to control that particular view, such as having two teams playing each other where one team is shown in top and other in bottom. Collectively the player(s) input for the first team may be directed for controlling aspects of the top screen's view and vice versa for the other team display, players and control input. However, the game or simulation model encompasses whole world, though input may be restricted to smaller model parts and the model may be distributed across theater game servers. Nevertheless, views are still presented to a display region as a composite image in traditional computer graphics methods.

Figure 8:
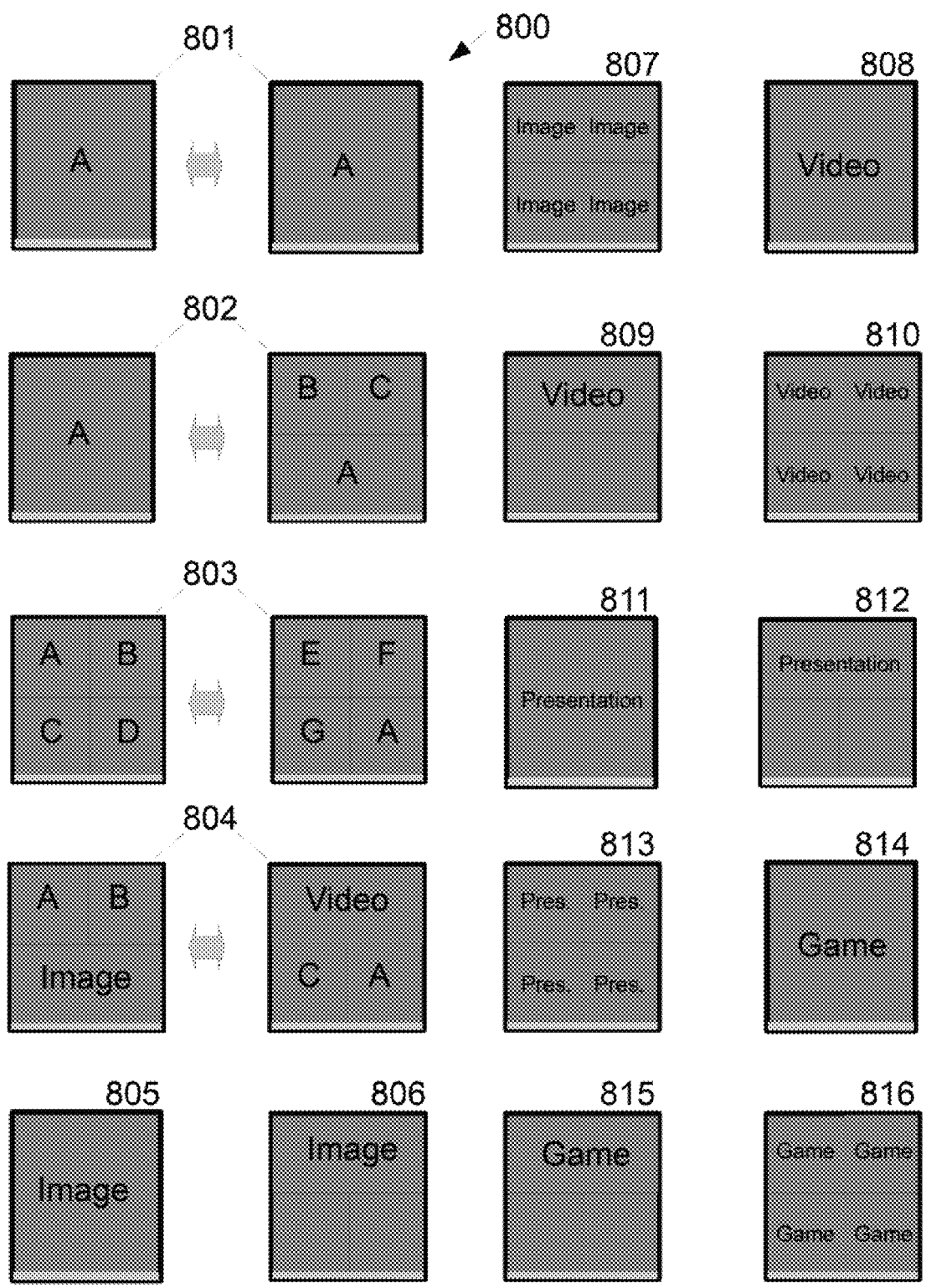
FIG. 8 illustrates various display screen configurations for events (e.g. games) playing across different screens.

FIG. 8 illustrates various display screen configurations for events (e.g. games) playing across different screens. As described in various embodiments, the system architecture allows multiple sites to feature multiple multimedia experiences on displays with different display regions that can vary by actual screen location, size and possibly view perspective. The various display screen configurations for events 800 enable the playing of many multimedia streams across different screen sites, sizes, locations and view perspectives, where participants at one theater auditorium site 102 or 201 may be all playing in an event displayed in a whole screen against participants in another theater auditorium site 102 or 201 which may be sharing a display screen system with other event multimedia streams, thus causing the second site to not display the first event on the whole screen. Display screen configurations 801 depict a networked configuration providing multiple full screen display for multimedia events, the whole screen at a first site versus another whole screen at a second site. Display screen configurations 802 depict a Screen Location and Size variation where the screen display region size and location may differ between event sites. Display screen configuration 802 shows event A content between sites can be either whole screen sized or sub-screen sized depending on content streams in use at a particular site. Screen size and location is content, time and demand based according to their individual configurations, theater management scheduling and other considerations such as theater site offering premium based events reserving whole screen or only subset of content for a particular location (auditorium) and time (event session). Display screen configuration 803 shows that screen multimedia content at sites may differ. Screen regions may feature different content per region and shared events across sites may be placed in different display regions. Display screen configuration 804 shows that screen display region modalities may differ. Display regions may differ in that any region can show both passive and interactive content, such as images, videos, interactive presentations, and games. Display screen configuration 805 shows a configuration with a full screen (display region) image in a passive modality. Display screen configuration 806 shows a configuration with a half screen (display region) image in a passive modality. Display screen configuration 807 shows a configuration with a quarter screen (display region) image in a passive modality. Display screen configuration 808 shows a configuration with a full screen (display region) video in a passive or interactive (movie) modality. Display screen configuration 809 shows a configuration with a half screen (display region) video in a passive or interactive (movie) modality. Display screen configuration 810 shows a configuration with a quarter screen (display region) video in a passive or interactive (movie) modality. Display screen configuration 811 shows a configuration with a full screen (display region) presentation in a passive or interactive modality. Display screen configuration 812 shows a configuration with a half screen (display region) presentation in a passive or interactive modality. Display screen configuration 813 shows a configuration with a quarter screen (display region) presentation in a passive or interactive modality. Display screen configuration 814 shows a configuration with a full screen (display region) game in a generally interactive modality. Display screen configuration 815 shows a configuration with a half screen (display region) game in a generally interactive modality.

Display screen configuration 816 shows a configuration with a quarter screen (display region) game in a generally interactive modality.

Figure 9:
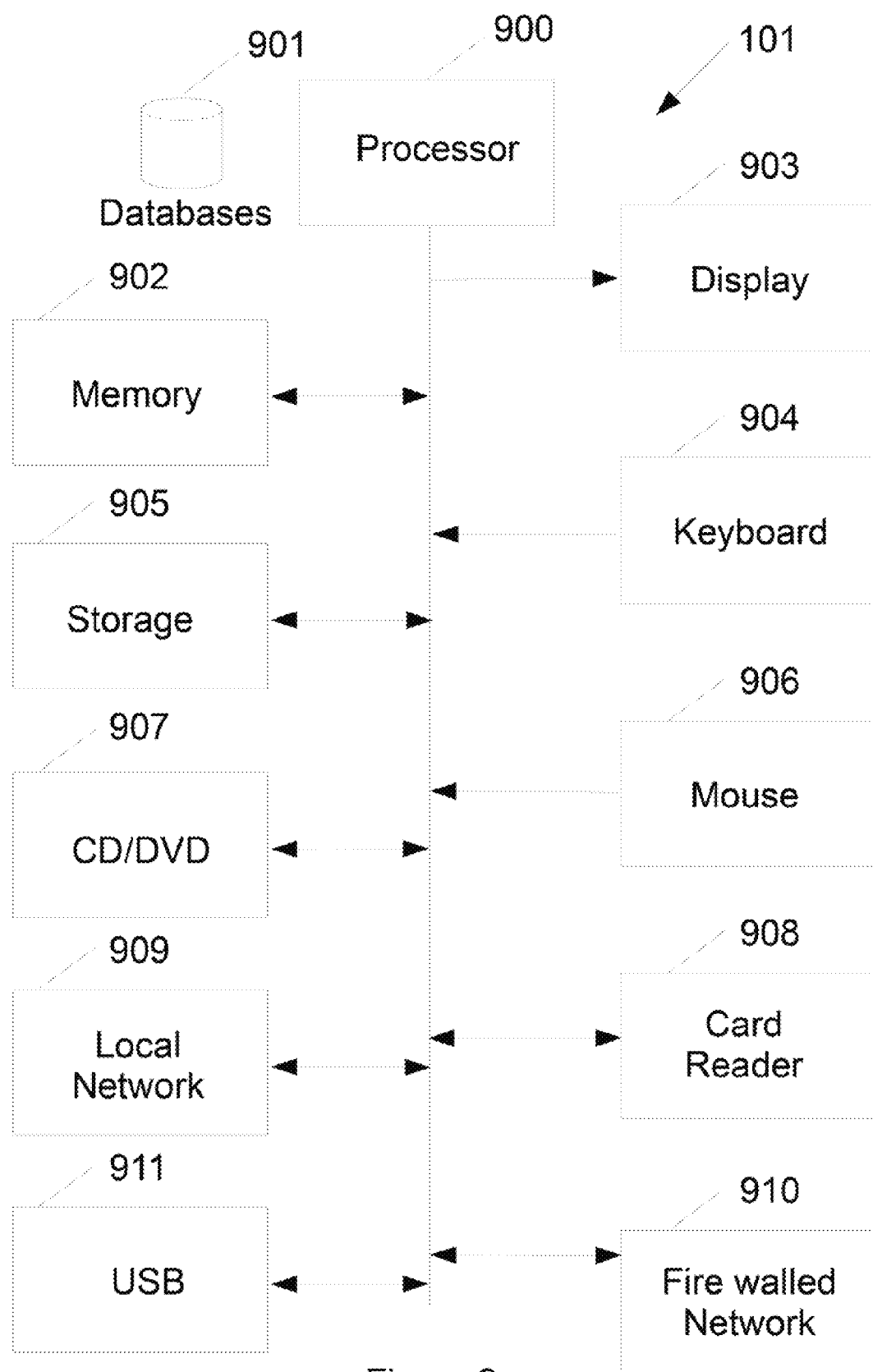
FIG. 9 illustrates a Theater Access Server 101 in a particular embodiment.

FIG. 9 illustrates a Theater Access Server 101 in a particular embodiment. As described in a particular embodiment, Theater Access Server 101 is an on-site server that intermediates access between the Internet 302 (content/communications) and premises equipment for both auditorium games and product/service sales using local databases of people, groups, events, advertisements, inventory and promotions. In a particular embodiment, Theater Access Server 101 includes Processor 900, such as an Intel (Pentium/Core 2 Duo) or AMD (Athlon) desktop machine, local databases 901, the content for which can be pulled from (Internet) remote web access content server 301 for site operations, memory 902, which can be RAM for computer program or data storage, display device 903, such as a video display, LCD, CRT, plasma display, or the like, keyboard 904, which can be a standard PC input device, such as a conventional QWERTY Latin ASCII based keyboard, data storage device 905, such as a hard drive, cursor control/pointing device 906, such as a conventional mouse, a CD/DVD device 907 for bulk storage and input, back ups, software installation, and offsite storage, card reader 908 for reading magnetic strip cards such as cash cards, credit cards and such, local network interface device 909 for connection with a local wired/wireless network for both sales (box office, kiosk, concessions) and auditorium data communications, fire-walled network 910 for access to the Internet, including access to the web access content server 301 and other logical remote theater sites (theater chain), a USB interface device 911 for both communication and external storage (reading or writing data).

Figure 10:
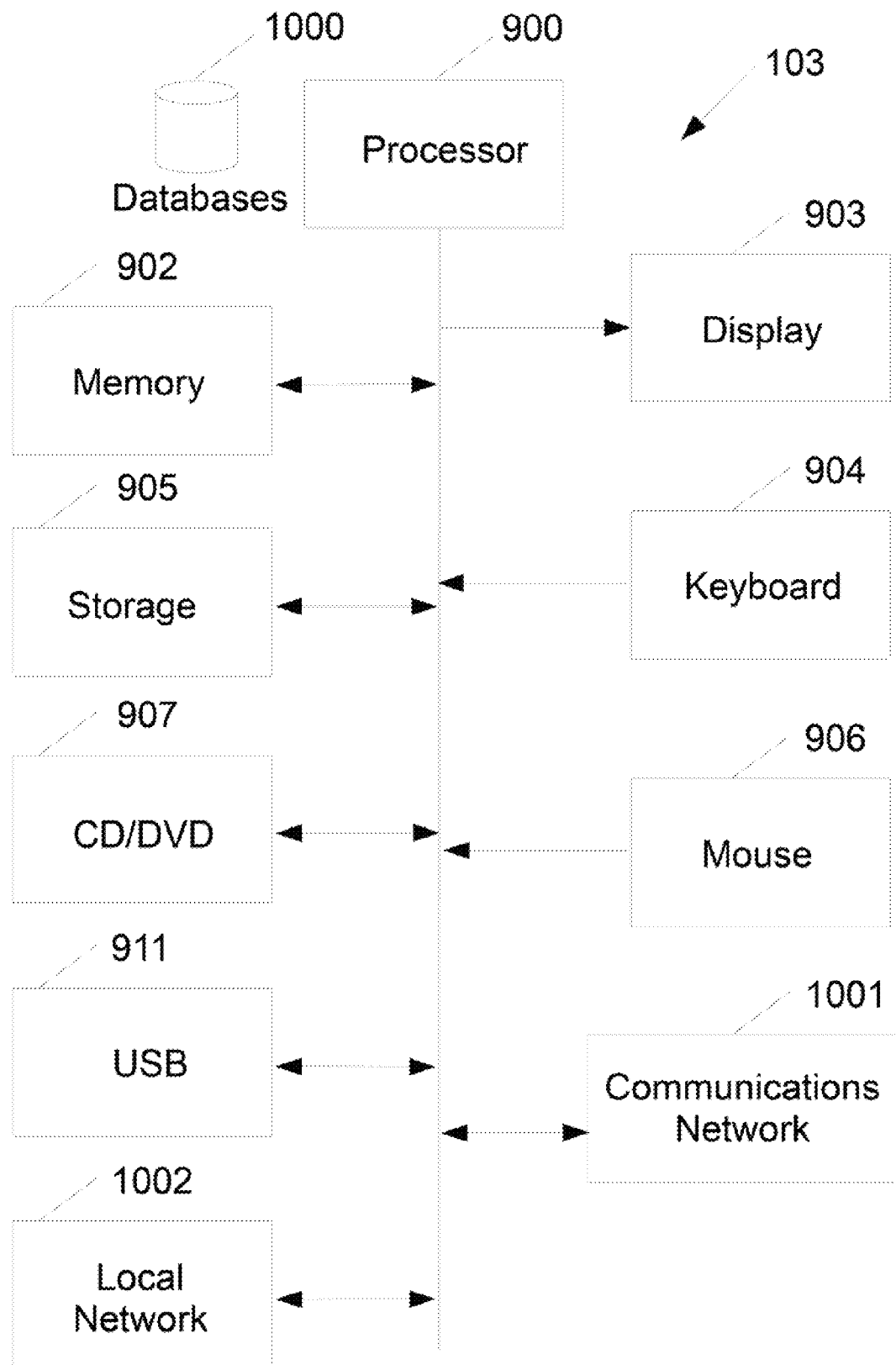
FIG. 10 illustrates a Theater Game Server 103.

FIG. 10 illustrates a Theater Game Server 103. As described in various embodiments, Theater Game Server 103 can execute multiple concurrent multimedia applications (movies & games), intermediates communication between local & remote game pad devices 107 and forwards customer messages such as product/service orders (food), friend text, SMS message invite requests, and application messages such as management disturbance or help requests. In a particular embodiment, Theater Game Server 103 includes Processor 900, such as an Intel (Pentium/Core 2 Duo) or AMD (Athlon) desktop machine, memory 902, which can be RAM for computer program or data storage, one or more display devices 903, such as a video display(s), LCD, CRT, plasma display(s), or the like (e.g. with one or more video cards), keyboard 904, which can be a standard PC input device, such as a conventional QWERTY Latin ASCII based keyboard, data storage device 905, such as a hard drive, cursor control/pointing device 906, such as a conventional mouse, a CD/DVD device 907 for bulk storage and input, back ups, software installation, and offsite storage, and a USB interface device 911 for both communication and external storage (reading or writing data). In addition, a particular embodiment of Theater Game Server 103 includes Theater Game Server Databases 1000, which include multimedia content (video, game, sound, scripts), data on players/groups, data on events (schedules, attendees), advertisements, promotions, presentations, ratings (movies, games, events) and local site details. Theater Game Server 103 further includes Auditorium Network Interface 1001 and Local Network interface 1002 to connect with a local wired/wireless network for access both to Theater Game Server 103 and other Game Servers.

Figure 11:
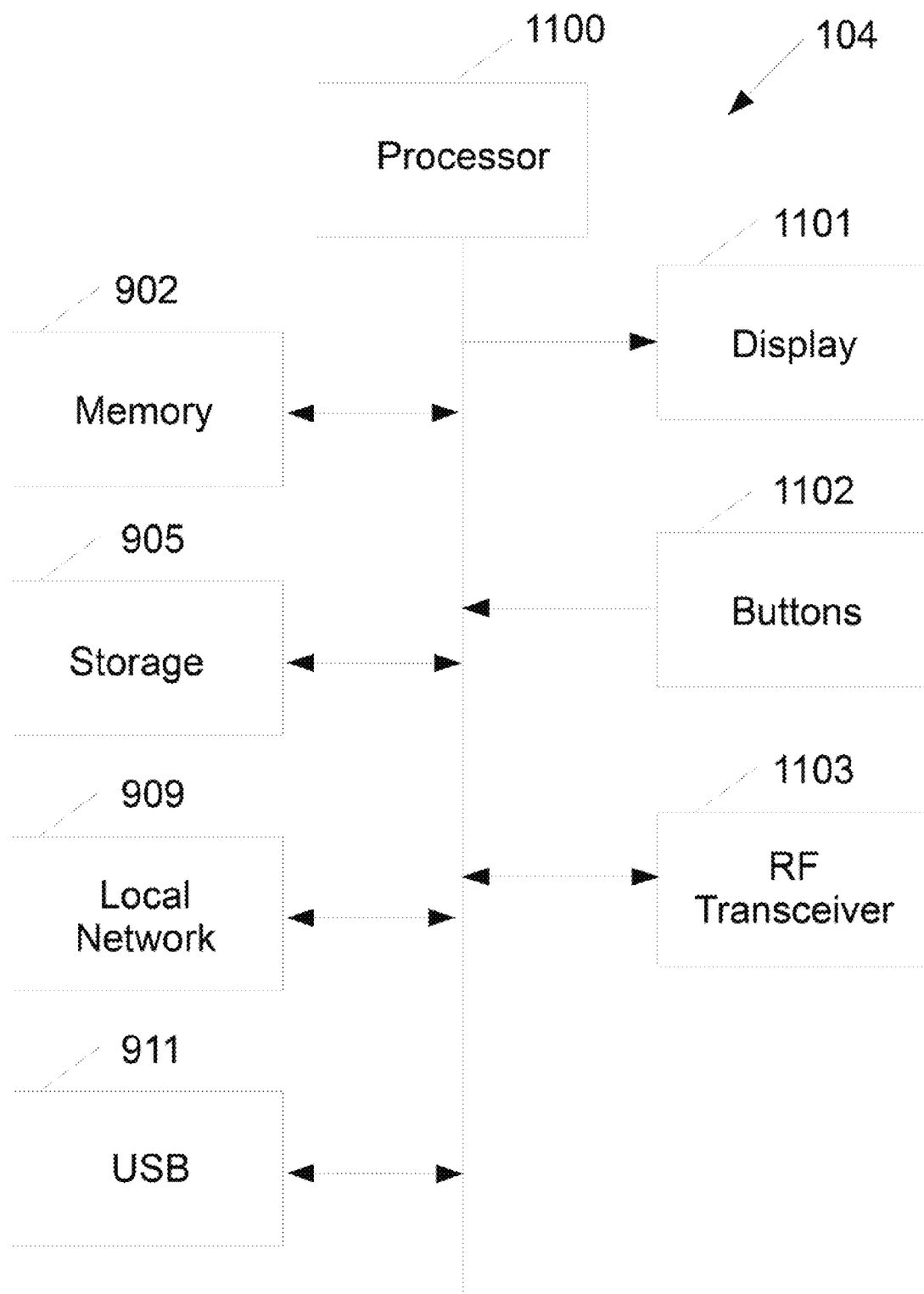
FIG. 11 illustrates a Theater Communications Controller 104.

FIG. 11 illustrates a Theater Communications Controller 104. As described in various embodiments, Theater Communications Controller 104 mediates wired/wireless communications between theater game pads (players) 107 or communication routers 105 and theater game server device 103 for tracking active networks and end node device general status/location. In a particular embodiment. Theater Communications Controller 104 includes Processor 1100, an embedded processor such as XScale or ARM with emphasis on embedded speed with low power, memory 902, which can be RAM for computer program or data storage, display device 1101, an embedded display that may be organized as rows of text characters or a graphical display featuring pixels much like a modern cell phone display, data storage device 905, such as a hard drive, and offsite storage, local network interface device 909 for connection with a game server device via a local wired/wireless network, and a USB interface device 911 for both communication and external storage (reading or writing data) of data. In addition, a particular embodiment of Theater Communications Controller 104 includes embedded device input buttons 1102, and RF Transceiver 1103 that supports wireless communication networks for either communication routers 105 or game pads 107.

Figure 12:
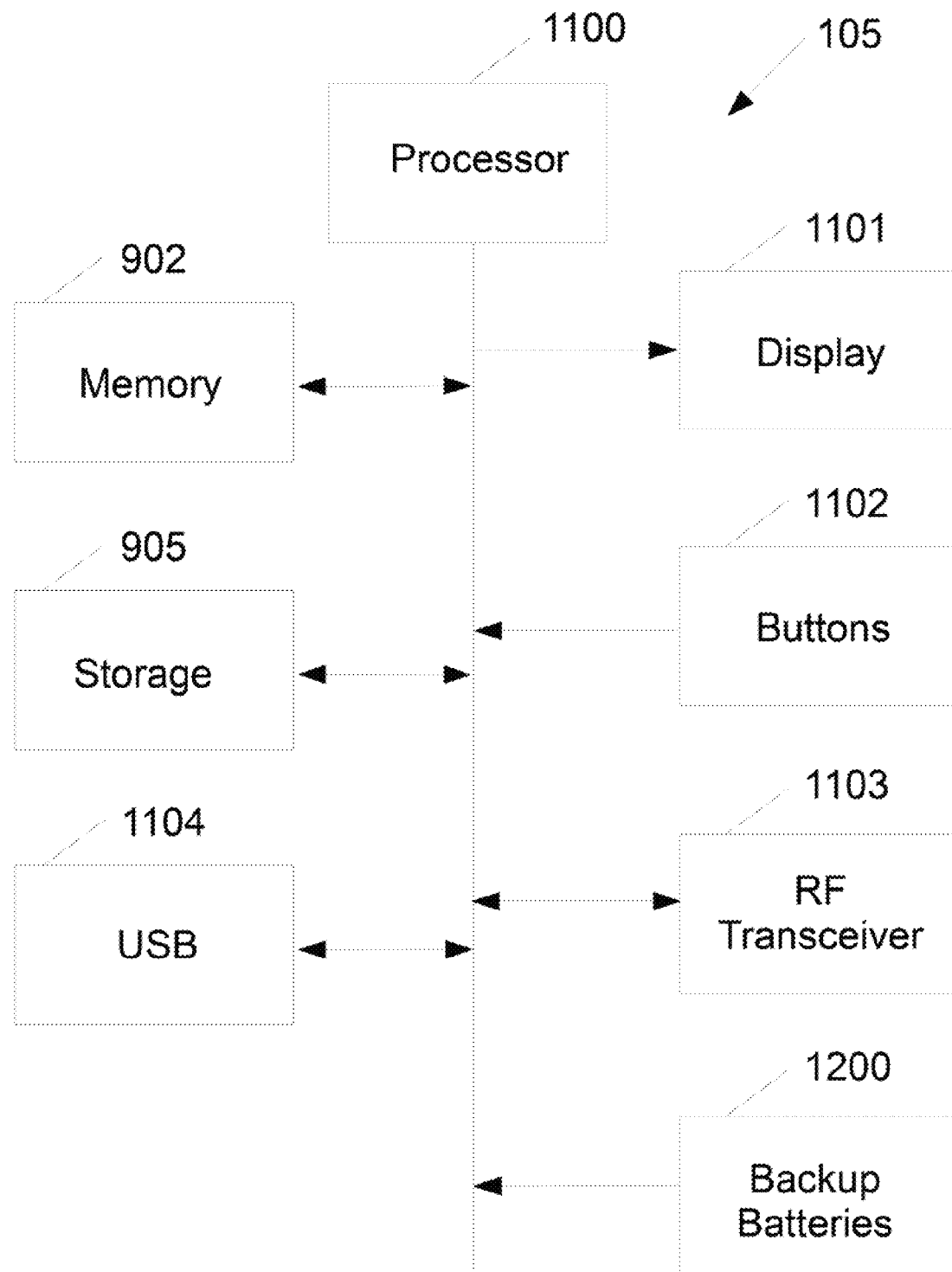
FIG. 12 illustrates a Theater Communications Router 105.

FIG. 12 illustrates a Theater Communications Router 105. As described in various embodiments, Theater Communications Router 105 mediates wireless access between theater game pads (players) 107 and theater communications controller device 104 for tracking end node device connections and buffering network communications. In a particular embodiment, Theater Communications Router 105 includes Processor 1100, an embedded processor such as XScale or ARM with emphasis on embedded speed with low power, memory 902, which can be RAM for computer program or data storage, display device 1101, an embedded display that may be organized as rows of text characters or a graphical display featuring pixels much like a modern cell phone display, data storage device 905, such as a hard drive, and offsite storage, and a USB interface device 1104 for both communication and external storage (reading or writing data). In addition, a particular embodiment of Theater Communications Router 105 includes embedded device input buttons 1102, RF Transceiver 1103 that supports wireless communication networks for game pads 107, and embedded battery power supply 1200 for back up power or main use for power.

Figure 13:
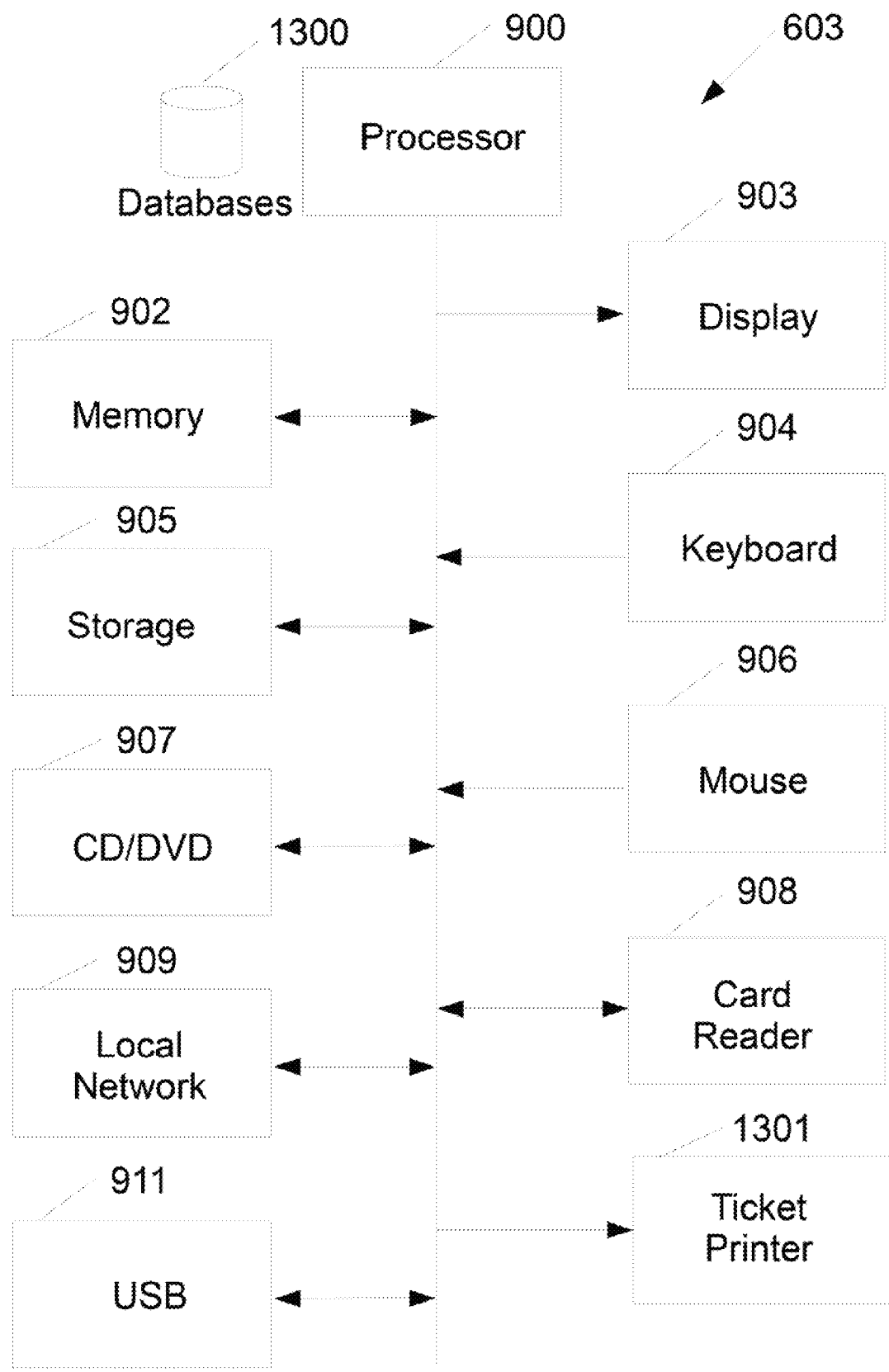
FIG. 13 illustrates a Theater Kiosk 603.

FIG. 13 illustrates a Theater Kiosk 603. As described in various embodiments, Theater Kiosk 603 allows theater patrons to search for events (movies, games, presentations), purchase tickets, enter personal profile data, join groups, sign up for group events and create events, plus send out group/buddy event invites via text messages. In a particular embodiment, Theater Kiosk 603 includes Processor 900, such as an Intel (Pentium/Core 2 Duo) or AMD (Athlon) desktop machine, memory 902, which can be RAM for computer program or data storage, display device 903, such as a video display, LCD, CRT, plasma display, or the like, keyboard 904, which can be a standard PC input device, such as a conventional QWERTY Latin ASCII based keyboard, data storage device 905, such as a hard drive, cursor control/pointing device 906, such as a conventional mouse, a CD/DVD device 907 for bulk storage and input, back ups, software installation, and offsite storage, card reader 908 for reading magnetic strip cards such as cash cards, credit cards and such, local network interface device 909 for connection with a game server device via a local wired/wireless network, and a USB interface device 911 for both communication and external storage (reading or writing data). In addition, a particular embodiment of Theater Kiosk 603 includes databases 1300 for event schedules, site details, groups, promotions, trailers and videos. Theater Kiosk 603 further includes ticket printer 1301 to print tickets for events, promotions and schedules.

Figure 14:
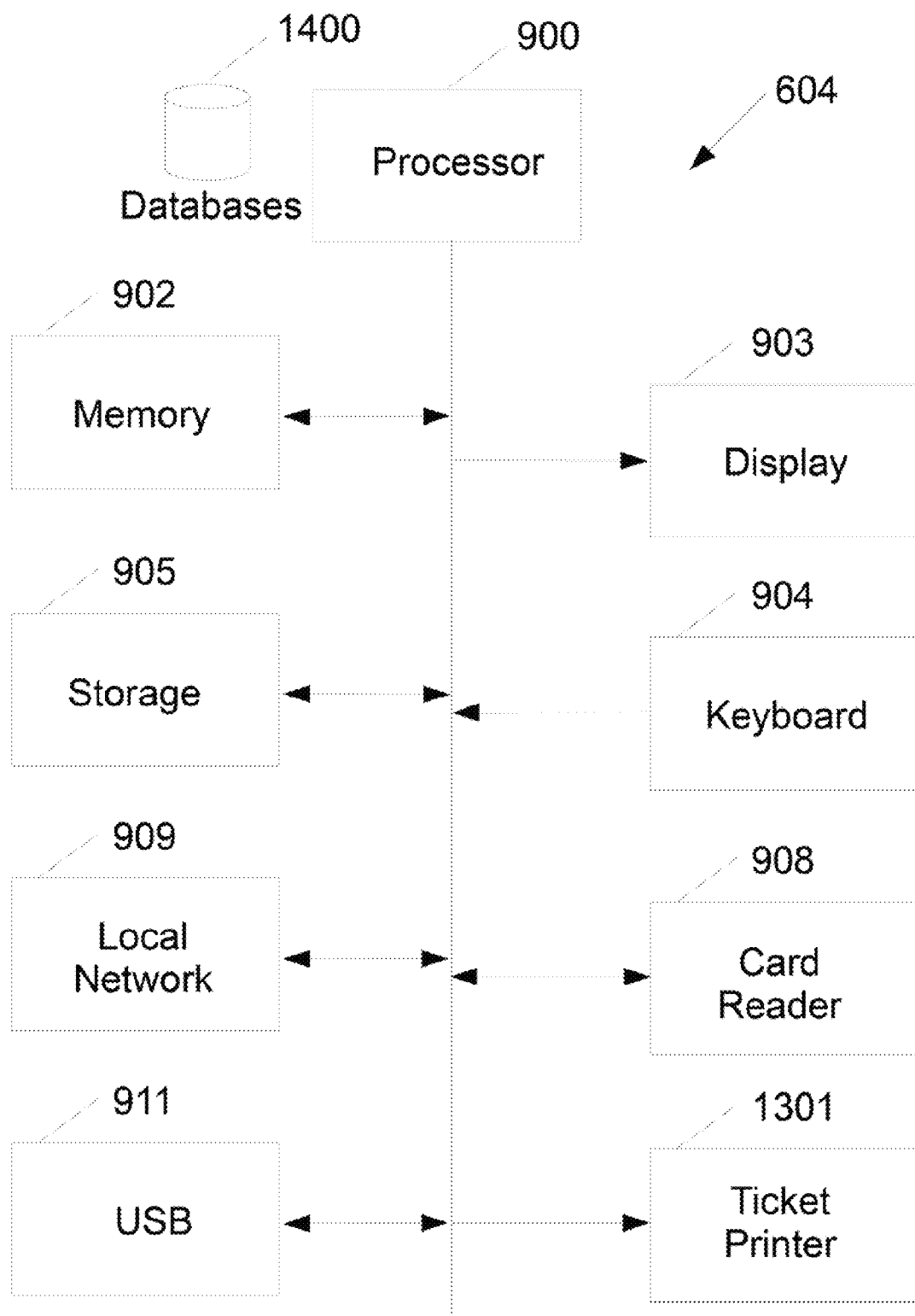
FIG. 14 illustrates a Theater Concession Terminal. 604.

FIG. 14 illustrates a Theater Concession Terminal 604. As described in various embodiments, Theater Concession Terminal 604 tracks inventory, promotions, events and receives remote orders from game pads 107. In a particular embodiment, Theater Concession Terminal 604 includes Processor 900, such as an Intel (Pentium/Core 2 Duo) or AMD (Athlon) desktop machine, memory 902, which can be RAM for computer program or data storage, display device 903, such as a video display, LCD, CRT, plasma display, or the like, keyboard 904, which can be a standard PC input device, such as a conventional QWERTY Latin ASCII based keyboard, data storage device 905, such as a hard drive, card reader 908 for reading magnetic strip cards such as cash cards, credit cards and such, local network interface device 909 for connection with a game server device via a local wired/wireless network, a USB interface device 911 for both communication and external storage (reading or writing data), and ticket printer 1301 to print tickets for events, promotions and schedules. In addition, a particular embodiment of Theater Concession Terminal 604 includes databases 1400 for inventory, promotions, event schedules, and game. server details.

Figure 15:
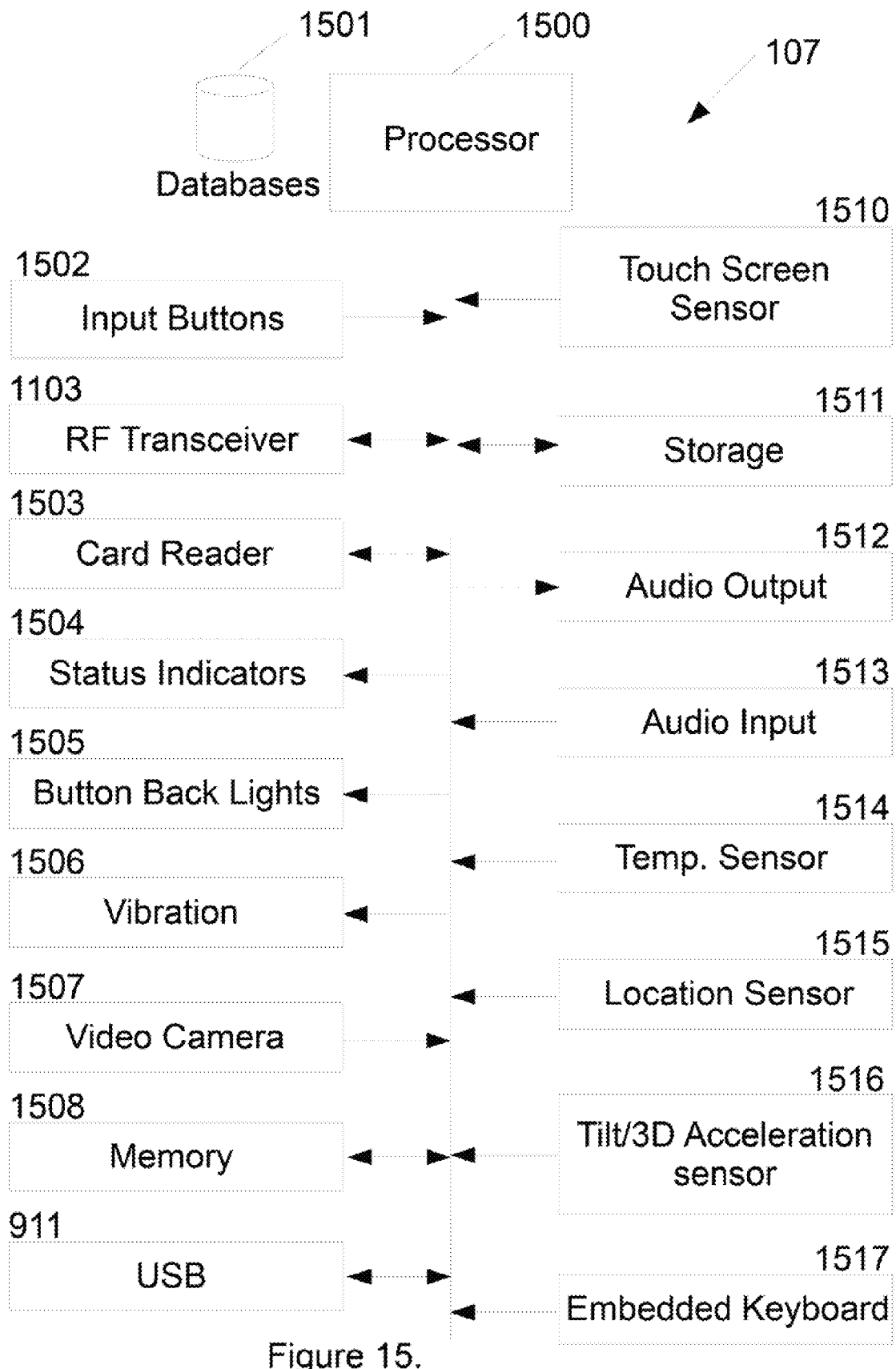
FIG. 15 illustrates a Theater Game Pad 107.

FIG. 15 illustrates a Theater Game Pad 107. As described in various embodiments, Theater Game Pad 107 supports wired/wireless game play, participation in interactive movies or presentations, plus facilitates chatting, search and playing with other people both in local theater auditorium and remote locations. In a particular embodiment, Theater Game Pad 107 includes Processor 1500, an embedded processor, RF Transceiver 1103 that supports wireless communication networks with communication routers 105, a USB interface device 911 for both communication and external storage (reading or writing data), databases 1501 for event data, player data, group data, game server details and data associated with other game pad devices in the same location, Input buttons 1502 providing a direction pad, game, help, menu (applications) and start/enter buttons, Card Reader 1503, Status indicators 1504 to show the current screen the player is logged into, team, and operation mode, Button back lights 1505 to indicate (in dark theater like areas) the available inputs, Vibration device 1506, Video Camera/Ambient Light sensor device 1507, Embedded Memory 1508, Touch Screen Sensor 1510, Storage 1511 for internal and/or interface for external storage such as USB/SD/MMC, Audio output, such as speaker or head phone jack connector 1512, Audio input, such as microphone jack connector 1513, Temperature sensor 1514, Location sensor device 1515, which can be used as an input if the device is mobile, Tilt/3D Accelerometer 1516, and Embedded Keyboard 1517.

Figure 16:
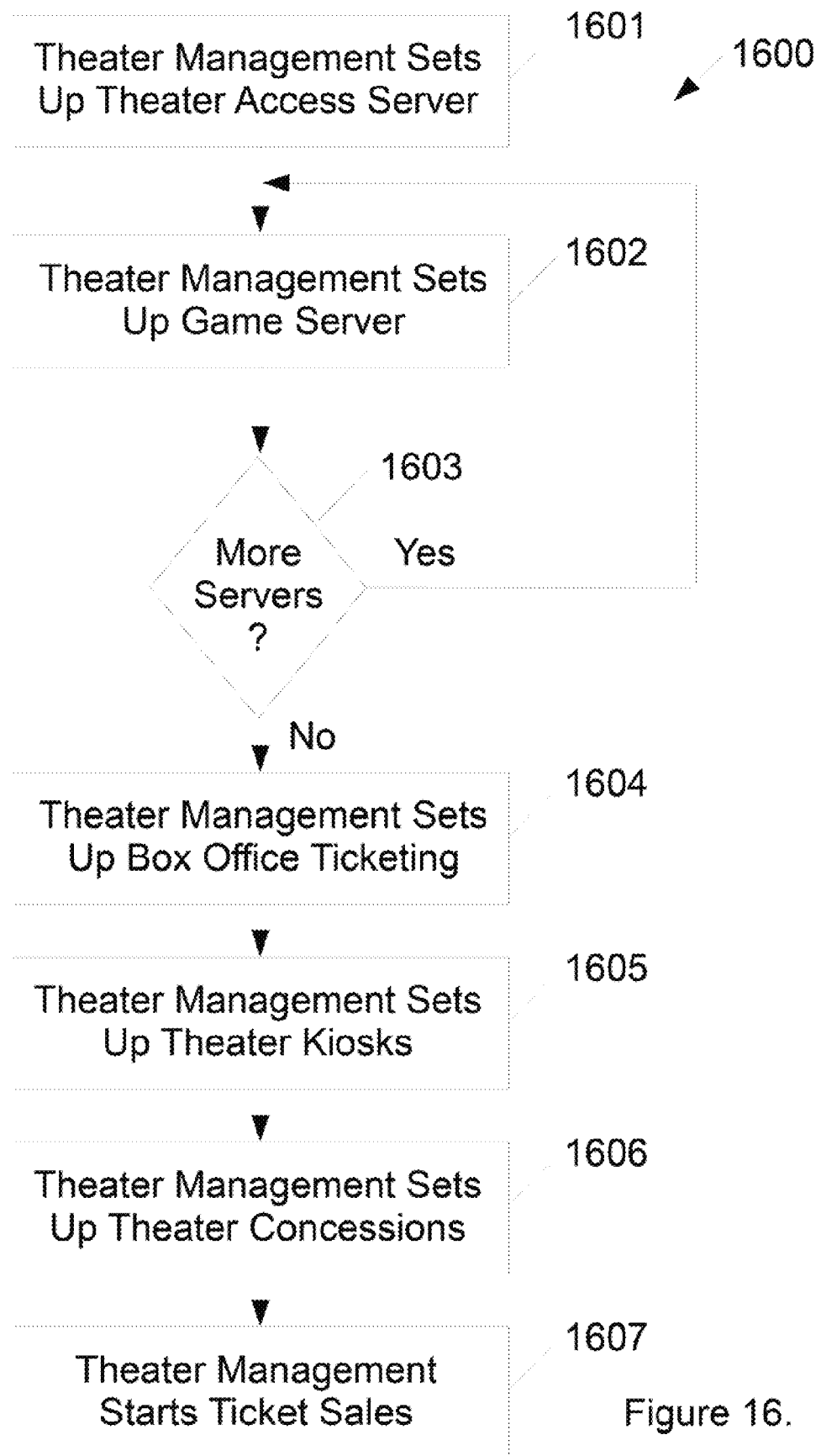
FIG. 16 illustrates a process 1600 for creating a Theater Site in a particular embodiment.

FIG. 16 illustrates a process for creating a Theater Site in a particular embodiment. As provided in a particular embodiment, the Theater Management Sets Up the Theater Access Server 101 in processing block 1601. In processing block 1602, the Theater Management Sets Up the Game Server(s) 103. In decision block 1603, Game Server 103 set up continues until all game servers are set up. In processing block 1604, Theater Management Sets Up Box Office Ticketing. In processing block 1605, Theater Management Sets Up Theater Kiosks 603. In processing block 1606, Theater Management Sets Up Theater Concession Terminal(s) 604. In processing block 1607, Theater Management Starts Ticket Sales at the Box office and at the Kiosk 603. Theater Management also starts processing orders at the concession terminal 604.

Figure 17:
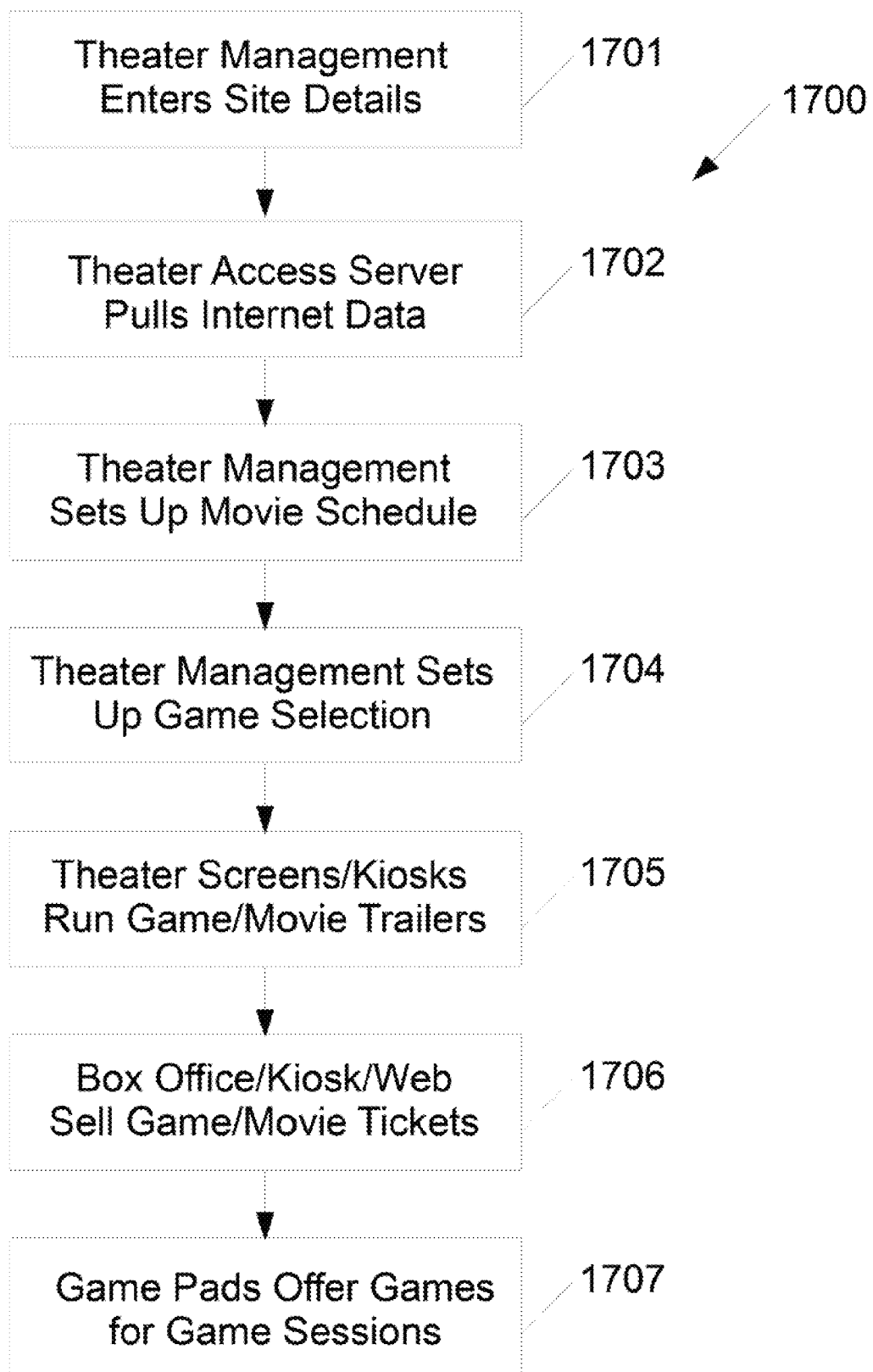
FIG. 17 illustrates a process 1700 for the set up of the Theater Access Server 101.

FIG. 17 illustrates a process for the set up of the Theater Access Server 101. As described in a particular embodiment, the process includes setting up a theater access server 101 with the Internet, ticketing, sales, event details (movies and games), plus allowing communication in/out for multi-site game play, customer download of data (event data) and player chat/schedules/invites. In processing block 1701, the Theater Management Enters Site Details, such as the name, location, theater chain, details on screens, game server(s), desired game content to download, schedules of events (movies/games), policy of event scheduling/communication, billing mechanisms (box office/cash card/credit card authorization) and layout of tickets printed. In processing block 1702, the Theater Access Server 101 Pulls Internet Data. In processing block 1703, Theater Management Sets Up the Movie Schedule. In processing block 1704, Theater Management Sets Up the Game Selection. In processing block 1705, Theater Screens/Kiosks Run Movie & Game Trailers. In processing block 1706, the Box Office/Kiosk/Web Sell Event (Movie and Game) Tickets. In processing block 1707, Game Pads 107 Offer Games for Game Sessions.

Figure 18:
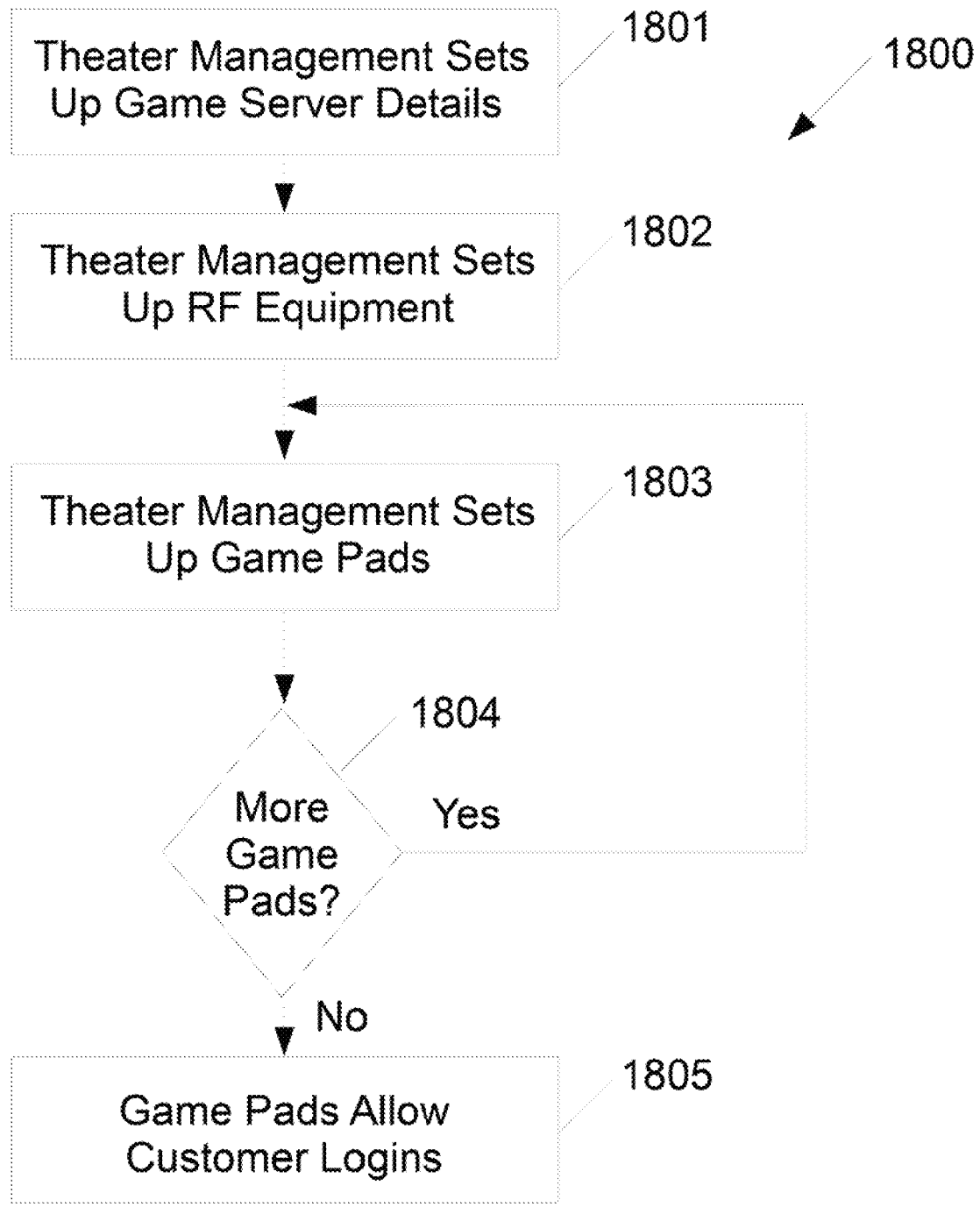
FIG. 18 illustrates a Theater Game Server 103 Setup 1800.

FIG. 18 illustrates a Theater Game Server 103 Setup. As described in a particular embodiment, Game server 103 can pull content in addition to movies, such as games, presentations, and educational/technical sessions. Theater Game Server 103 can handle input from customers playing games or interactive content both locally and on other game servers, plus send out text messages or process data from the web. In a particular embodiment, Theater Game Server 103 Setup processing is shown in FIG. 18. In processing block 1801, Theater Management Sets up Game Server 103 details. In processing block 1802, Theater Management Sets up RF equipment. In processing block 1803, Theater Management Sets up Game Pad(s) 107. In decision block 1804, processing of game pads 107 continues until all game pads 107 are set up. In processing block 1805, Game Pads 107 allow customer logins (guest, member and host modes).

Figure 19:
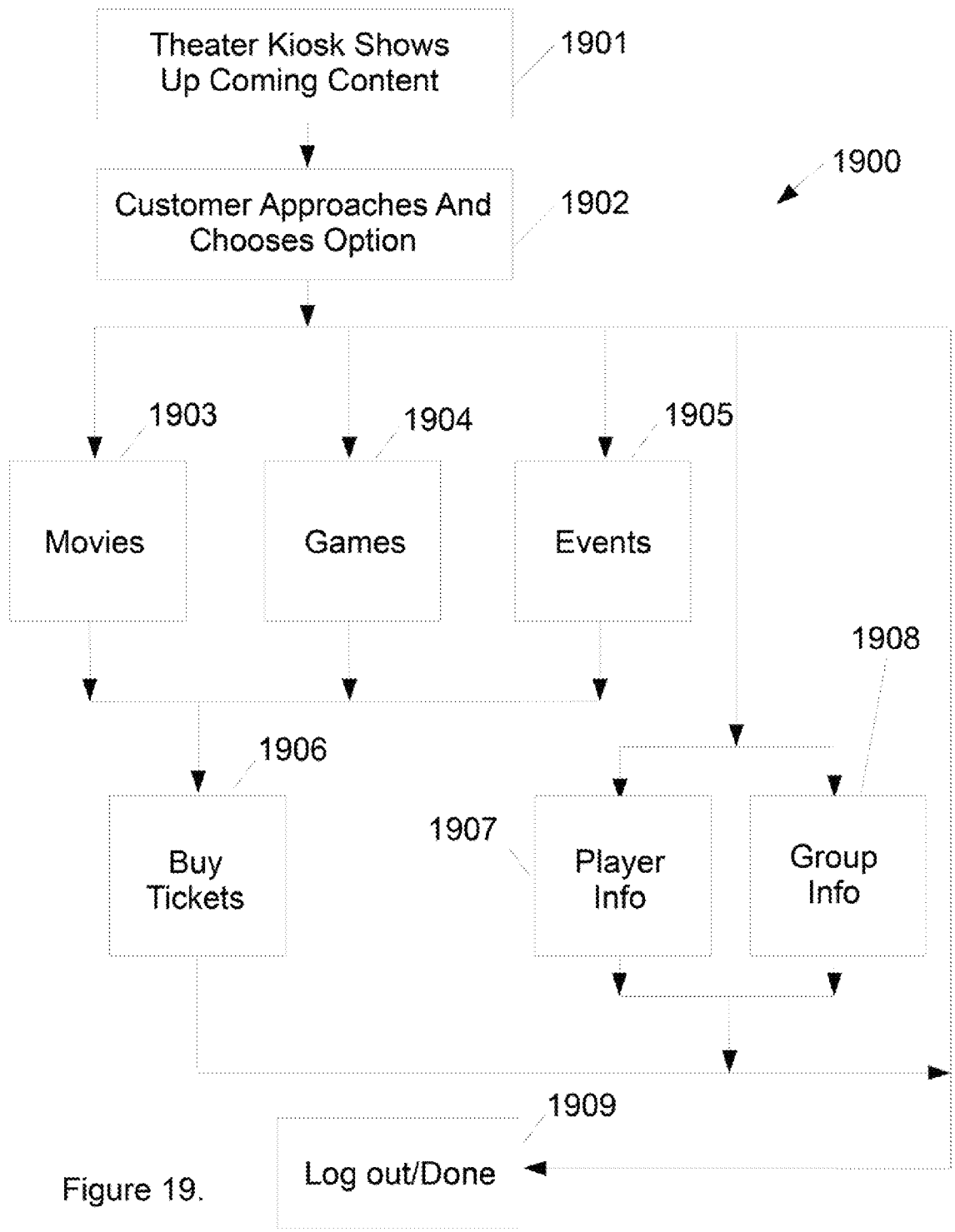
FIG. 19 illustrates a process for Theater Kiosk 603 with Customer Interactions 1900.

FIG. 19 illustrates a process for Theater Kiosk 603 with Customer Interactions. As described in a particular embodiment, a Theater Kiosk 603 allows a customer to search/buy event tickets, enter player/group details and send player invites (text messages or invite into group). In a particular embodiment, Theater Kiosk 603 processing is shown in FIG. 19. In processing block 1901, Theater Kiosk 603 shows upcoming content. In processing block 1902, a customer approaches the kiosk 603 and chooses an option. The available options are shown in blocks 1903-1909. In processing block 1903, a customer chooses a Movies option. In processing block 1904, a customer chooses a Games option. In processing block 1905, a customer chooses a General Event option (presentation, such as a technical or educational session). In processing block 1906, a customer chooses a Buy Tickets option. In processing block 1907, a customer chooses an Edit Player Information option. In processing block 1908, a customer chooses an Edit Player Group Details option, such as schedule, events and rating recommendations. In processing block 1909, a customer chooses a Logout option.

Figure 20:
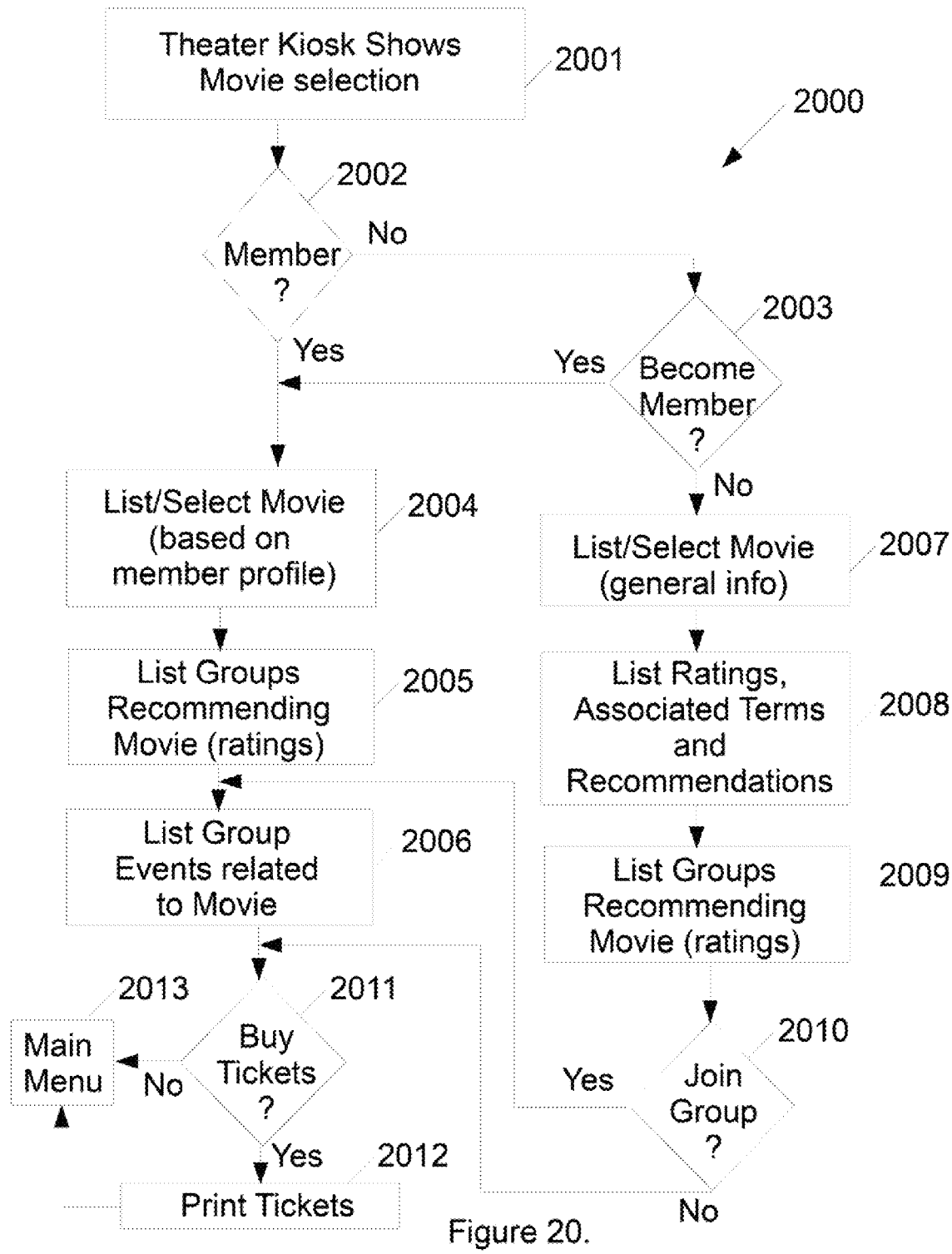
FIG. 20 illustrates a Theater Kiosk 603 Movie Search and Ticket Purchase 2000.

FIG. 20 illustrates a Kiosk 603 Movie Search and Ticket Purchase. As described in a particular embodiment, using customer and movie meta information, ratings and group recommendations, a customer is able to search and purchase tickets easily, plus schedule the movie so that others such as a group or buddy list can be invited along to the movie. In processing block 2001, Theater Kiosk 603 shows a movie selection option. In decision block 2002, the kiosk 603 uses the customer login identifier (if any) to determine if the customer is already a member with user profile information. If the customer is currently a member, processing continues at block 2004. If the customer is not currently a member, processing continues at decision block 2003. In decision block 2003, the customer is asked if s/he would like to become a member. If the customer chooses to become a member, processing continues at block 2004. If the customer chooses to not become a member, processing continues at block 2007. In processing block 2004, kiosk 603 can list and select a movie (listing ranked based on customer profile or events attended, interest keywords, group information, and other information relevant to this particular customer). In processing block 2005, kiosk 603 can list groups (name/description) who have ranked this movie before. In processing block 2006, kiosk 603 can list group events that may have featured the movie or have/will discuss this movie (e.g. fan groups). In processing block 2007, kiosk 603 can list and select a movie showing general details (title, actors, director, genre, description). In this case, customer profile information is not available. In processing block 2008, kiosk 603 can list ratings, associated terms and recommendations for the selected movie. In processing block 2009, kiosk 603 can list groups that recommend this movie (name, description). In decision block 2010, the customer is asked if s/he would like to join a group that recommends this movie or will discuss it at an event. If the customer chooses to join a group, processing continues at block 2006. If the customer chooses to not join a group, processing continues at block 2011. In decision block 2011, the customer is asked if s/he would like tickets printed. If so, the tickets are printed in processing block 2012 and the customer is directed back to the main menu.

Figure 21:
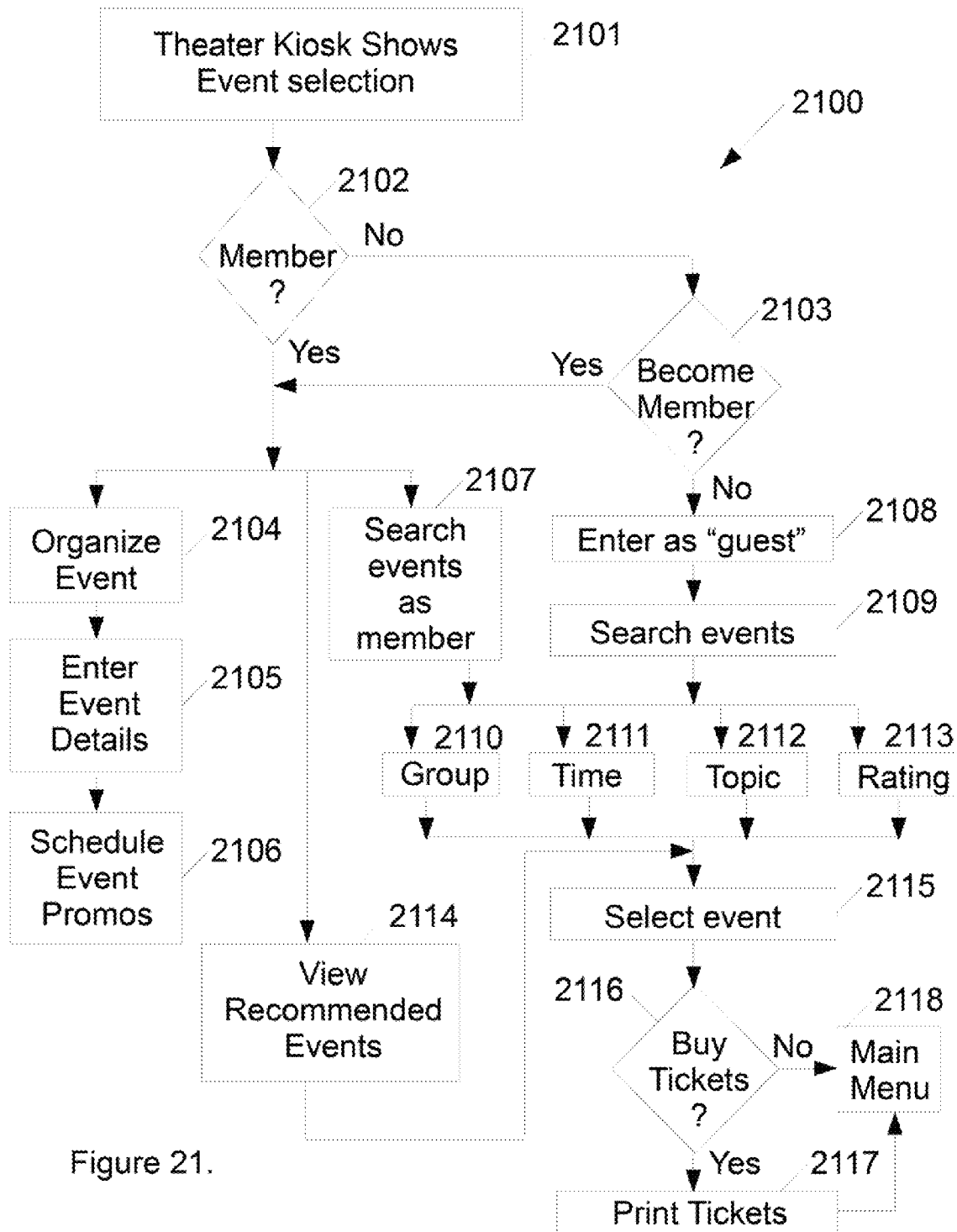
FIG. 21 illustrates a Theater Kiosk 603 Event Search and Ticket Purchase 2100.

FIG. 21 illustrates a Kiosk 603 Event Search and Ticket Purchase. As described in a particular embodiment, using customer and event meta information, ratings and group recommendations, a customer is able to search and purchase tickets easily, plus schedule the event so that others, such as a group or buddy list, can be invited along to the event. In processing block 2101, Theater Kiosk 603 shows an event selection option. In decision block 2102, the kiosk 603 uses the customer login identifier (if any) to determine if the customer is already a member with user profile information. If the customer is currently a member, processing continues at blocks 2104, 2107, or 2114. If the customer is not currently a member, processing continues at decision block 2103. In decision block 2103, the customer is asked if s/he would like to become a member. If the customer chooses to become a member, processing continues at blocks 2104, 2107, or 2114. If the customer chooses to not become a member, processing continues at block 2108. In processing block 2104, the customer is offered an option to organize a new event. In processing block 2105, the customer can enter details of event (title, description, keywords, location, group/host sponsor, cost, URL) and schedule the event, possibly pending theater management approval. In processing block 2106, the customer can schedule event promotions, advertisements and possibly trailer videos to show. In processing block 2107, the customer is offered an option to search events as a member, based on various criteria, including group, time, topic, and rating. In processing block 2108, the customer is offered an option to enter event search/selection as a guest (e.g. no previously stored customer profile or history information is available). In processing block 2109, the customer is offered an option to search events based on various criteria, including group, time, topic, and rating. In processing block 2110, the customer is offered an option to search and list events based on groups hosting an event (group name or group meta information). In processing block 2111, the customer is offered an option to search and list events based on a time an event will occur. In processing block 2112, the customer is offered an option to search and list events based on a topic (description or keywords). In processing block 2113, the customer is offered an option to search and list events based on ratings the event has received in previous occurrences. In processing block 2114, as a member with profile and perhaps group profile details, the customer is offered an option to view recommendations based on matches and ratings. In processing block 2115, the customer/member is offered the option to select an event to attend. In processing block 2116, the customer is asked if s/he would like to purchase tickets. If so, the tickets are printed in processing block 2117 and the customer is directed back to the main menu.

Figure 22:
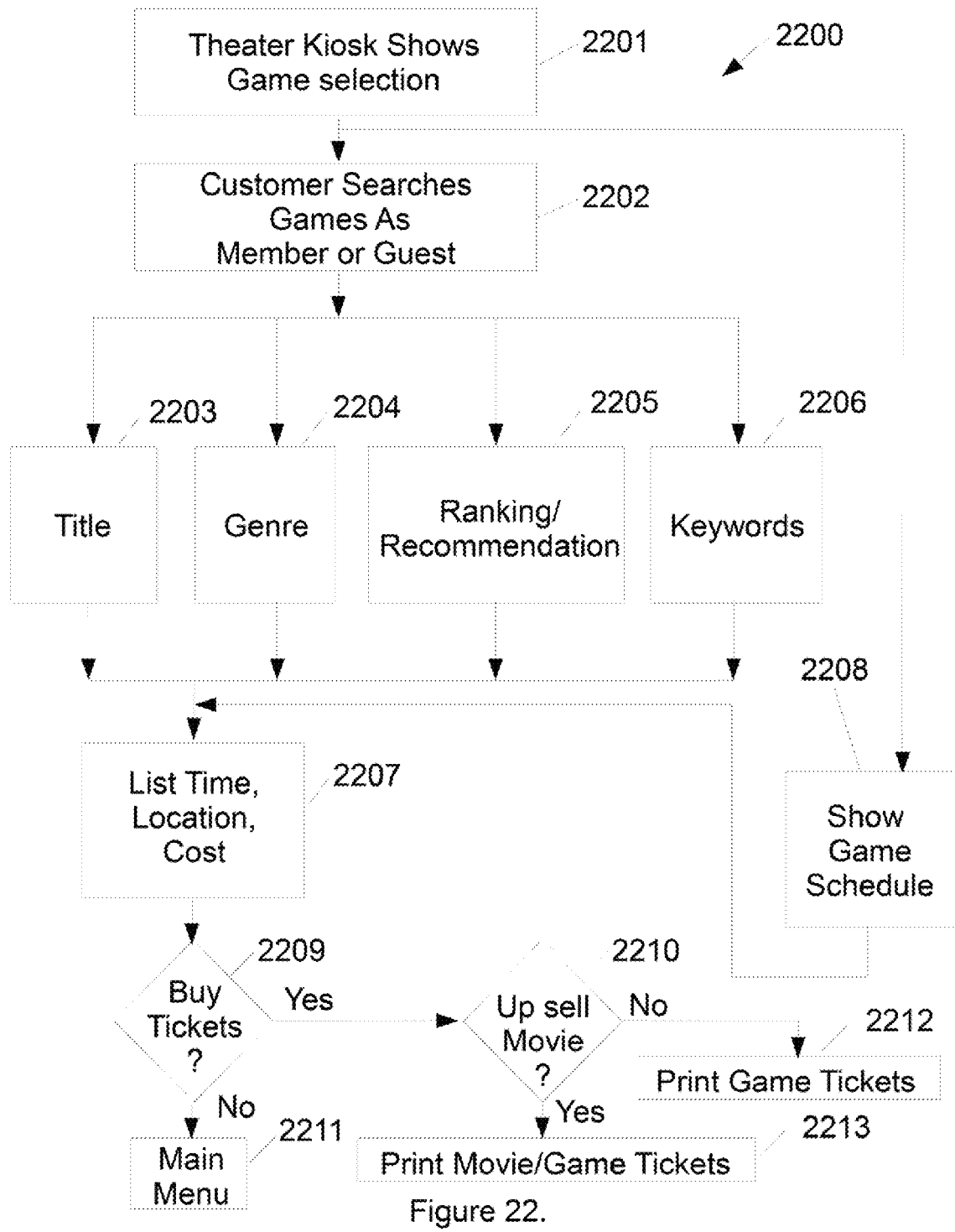
FIG. 22 illustrates a Theater Kiosk 603 Game Search and Ticket Purchase 2200.

FIG. 22 illustrates a Kiosk 603 Game Search and Ticket Purchase. As described in a particular embodiment, using player and game meta information, ratings and group recommendations, a customer is able to search and purchase tickets easily, plus schedule the game or game session so that others, such as a group or buddy list, can be invited along to play the game. In processing block 2201, Theater Kiosk 603 shows a game selection option. In processing block 2202, the customer can search games, as a member or a guest, by various criteria, including title, genre, ranking, keywords, and the like. In processing block 2203, the customer is offered a list of games by title (e.g. Pacman). In processing block 2204, the customer is offered a list of games by genre (e.g. Action/Arcade/Retro). In processing block 2205, the customer is offered a list of games by ranking (most often played by this customer, customer group members, site) and ratings. In processing block 2206, the customer is offered a list of games by description or keywords. In processing block 2207, the customer is offered game time & location (auditorium screen currently played/offered) and cost for a particular game. In processing block 2208, the customer is shown a game schedule when offered (include future times/locations). In decision block 2209, the customer is asked if s/he would like to purchase game tickets. If so, the customer is offered the option to purchase movie tickets also for the next movie showing in the auditorium for the game in decision block 2210. If the customer chooses to buy game and movie tickets, the movie and game tickets are printed in processing block 2213. If the customer chooses not to buy movie tickets, the game tickets are printed in processing block 2212. In processing block 2211, the customer can return back to a main menu (searching movies, games, events, profile/group details).

Figure 23:
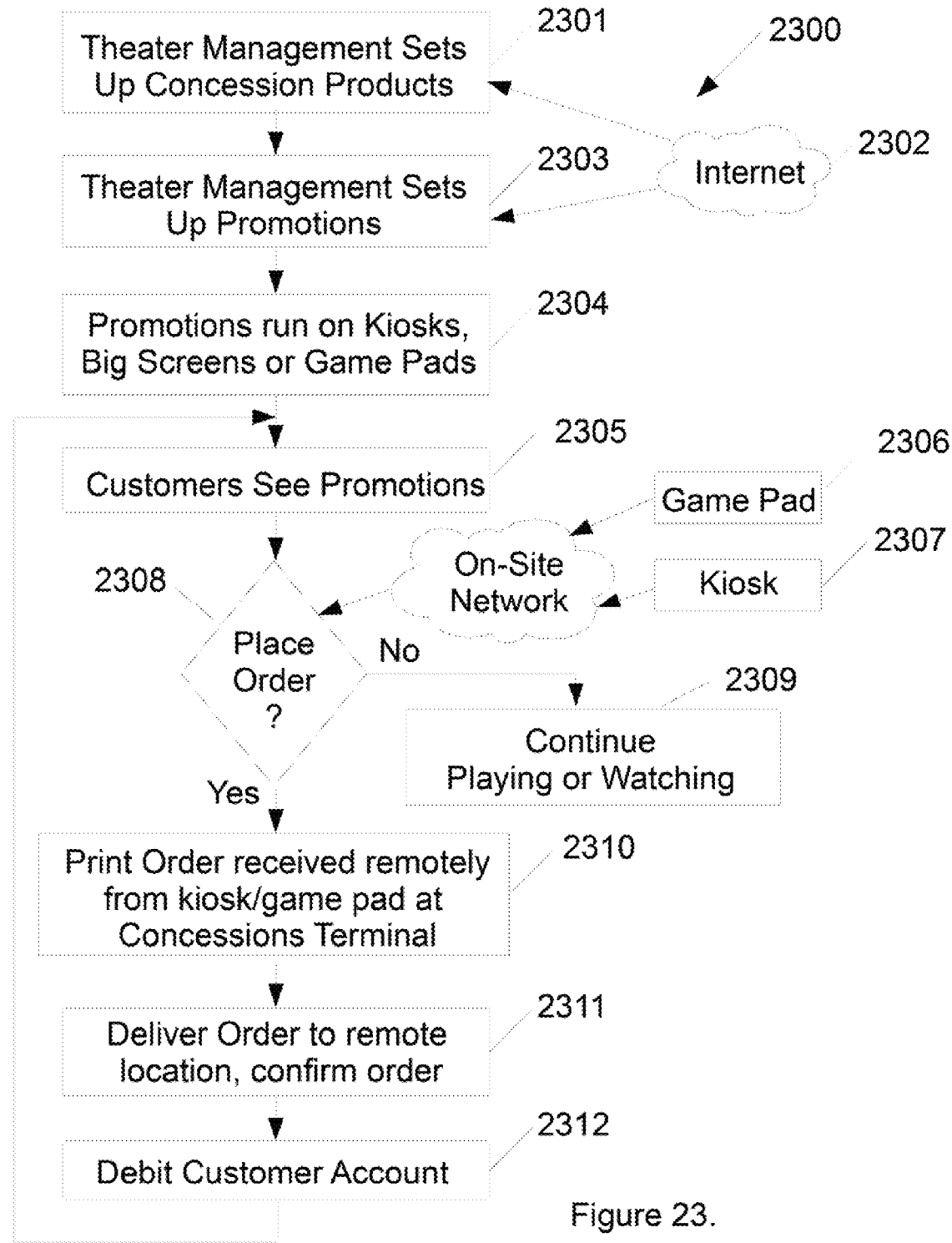
FIG. 23 illustrates a Theater Concession Terminal 604 Product/Service Remote Purchase 2300.

FIG. 23 illustrates a Theater Concession Terminal Product/Service Remote Purchase. As described in a particular embodiment, inventory, advertisement, promotions, ordering, delivery and account debit are handled in a distributed manner, where customers see advertisements and promotions at remote locations (kiosk/auditoriums/game pads), and then can order those items to have delivered to their seat in the auditorium. In processing block 2301, Theater Management sets up concession products (e.g. inventory and prices). In processing block 2303, Theater Management sets up promotions (price, products, time, event, duration, conditions, quantity), schedules when/how to show promotions (image, video, ticket stub, game pad, auditorium screen, kiosk, web and phone). As part of this process, Theater Management can pull movie schedules, advertiser information/images/video, promotional information, pricing information, product information, and the like from various sources via the Internet 2302. In processing block 2304, promotions run on kiosk 603, big screens and game pads 107.

In processing block 2305, customers see promotions at the kiosk 603, big screens and game pads 107. In processing block 2306, customers may see promotions on the big screen or game pad 107 and place an order using game pad 107 while seated in one of the auditoriums. In processing block 2307, customers may see promotions while at kiosk 603, and order products/services using kiosk 603, the ordered products/services optionally being provided to the customer when the customer is in attendance at a related event (e.g. movie, game, presentation or general event). Note that product/service orders placed by customers seated in the auditorium(s) using the game pad 107 can be communicated wirelessly to the theater concession terminal 604 via the theater communications controller 104 and the theater access server 101. Product/service orders placed by customers using the kiosk 603 can be communicated wirelessly or directly wired to the theater concession terminal 604. Similarly, confirmations and receipts can be conveyed back to the customers placing orders using game pads 107 or kiosk 603 via the two-way communication channels described above. In this manner, a particular embodiment enables wired or wireless communication of promotions or offerings to customers in one or more auditoriums and enables wired or wireless product/service ordering and fulfilment. In decision block 2308, a customer is offered an option to place an order for a product or service using the game pad 107 or kiosk 603. If the customer declines the option to order a product/service, the customer may continue chatting, playing a game or watching a movie/videos in processing block 2309. If the customer accepts the option to order a product/service via the game pad 107 or the kiosk 603, the customer order is electronically communicated (wired or wirelessly), as described above, to the theater concession terminal 604. In processing block 2310, the customer order is printed or displayed at the concession terminal 604 as received from the remote devices (i.e. game pad 107 or kiosk 603). In processing block 2311, the customer order can be delivered by theater management to the ordering customer at a location determined by the kiosk 603 identifier or the game pad 107 identifier in combination with the game pad location sensor 1515. A confirmation or receipt can be electronically delivered to the customer via the game pad 107 or the kiosk 603. If the ordered product/service is for a future event (e.g. advanced scheduled event), the future delivery of the product/service is confirmed with the customer by their sales confirmation code. In processing block 2312, theater management approves or adjusts customer account debit depending on successful delivery of the ordered product/service. Note that the goods/services sold by the Theater Management can include game time (e.g. credit or tokens for use in playing a game) as a concession product. A customer can use game pad 107 as described above to order game credit for him/herself or game credit for use by another player. In this manner, a first player can use game pad 107 to buy game credit for one or more other players. For example, a first player can order game credit for players on his/her buddy list using game pad 107. A first player can also order game credit for family members using game pad 107.

Figure 24:
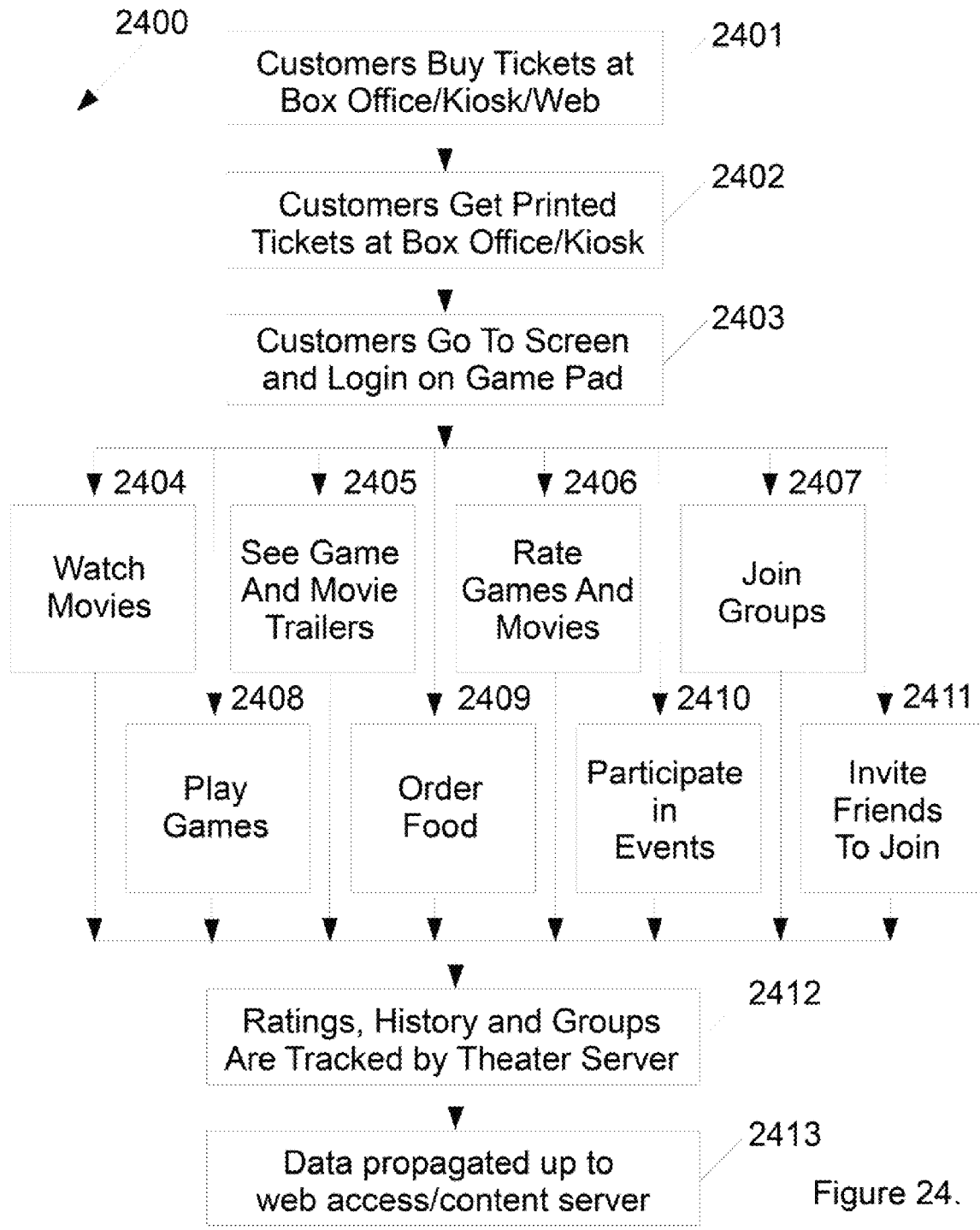
FIG. 24 illustrates a process for Customer Sign In, Purchase, Play and Coming Back to Theater Sites 2400.

FIG. 24 illustrates a process for Customer Sign In, Purchase, Play and Coming Back to Theater Sites. As described in a particular embodiment, wired/wireless game pads 107, game servers 103, theater access servers 101 and the system infrastructure described above enable customers to use profile information, community group membership, ratings and rankings to participate at events, purchase products/services while at events, chat with friends at events, or invite their friends to events. In processing block 2401, customers may buy tickets at a box office, kiosk 603, or via the Internet (e.g. WWW). In processing block 2402, customers receive a printed ticket at the box office, kiosk 603, or via mail (e.g. web orders option). In processing block 2403, customers go into a theater auditorium enabled with the functionality described herein and log into a game pad 107 using their ticket session/event code (optional for guests/movie only watchers). Once logged in, customers may choose from a variety of options, including viewing/editing their customer profiles. In processing block 2404, customers may select an option to watch a movie. In processing block 2405, customers may select an option to see game & movie trailers. In processing block 2406, customers may select an option to rate games and movies. In processing block 2407, customers may select an option to join one or more groups. In processing block 2408, customers may select an option to play games in progress (already being played by other players) or to play available games (not already being played by other players), selected games being playable both locally and with remote players. In processing block 2409, customers may select an option to order products/services, such as food from concessions (described above in connection with FIG. 23). In processing block 2410, customers may select an option to participate in events, such as presentations, educational/technical training, or survey/polls. In processing block 2411, customers may select an option to chat or invite friends (e.g. SMS text messages) to join them in the event. In processing block 2412, comments and ratings on the events are tracked for future customers, events and advertisements/promotions. In processing block 2413, data is propagated up to the web access/content server 301.

Figure 25:
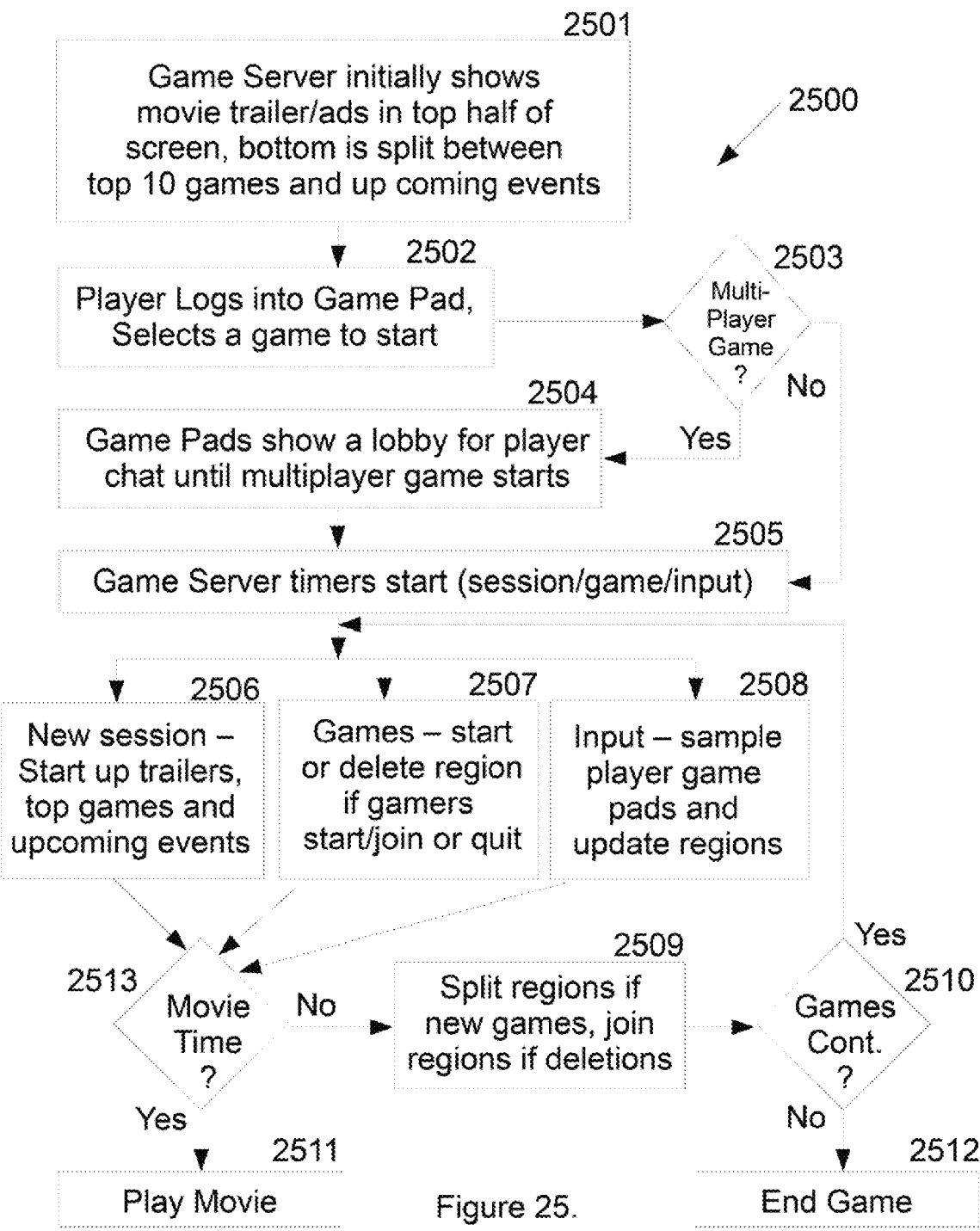
FIG. 25 illustrates a process for large, shared auditorium screen start up and player start 2500.

FIG. 25 illustrates a process for large, shared auditorium screen start up and player start. In a home setting, the shared screen is not as large as a theater auditorium display screen. However, the screen is still shared by a plurality of viewers. Thus, the term, 'shared screen' can be considered to cover both the large, shared auditorium screen and a shared home screen. As described in a particular embodiment, the use of the large shared auditorium screen is demand based, unless reserved for a particular event, which supports multiple either demand selection based or pre-selected by theater management multimedia streams (movies, trailers, advertisements, games, or presentations), where a timer is started by the game server 103 that ranks & merges display regions depending on configuration settings. In process 2500, the large, shared auditorium screen supports multiple either demand selection based or pre-selected by theater management multimedia streams. The individual, private small game pad 107 display screens can be used for customer login as a player/participant, entering input, chatting with buddies, team mates and group members, plus local applications for game pad 107, such as theater management help and product or service order placement for delivery to customers seated in the auditorium(s). In processing block 2501, the game server initially shows movie trailer/advertisements in the top half of the large, shared auditorium screen. The lower display regions are split between listing the top ten games and up-coming events. The bottom status bar 707 denotes the next movie title and time of showing. In processing block 2502, the customer comes into an auditorium with a ticket, selects a seat and game pad 107, logs into game pad 107 with the ticket session code, and selects a game to play (searching by title, genre, descriptions or such, as described above). In decision block 2503, the customer may select a multiplayer game. If a multiplayer game is selected, processing continues at processing block 2504. If a multiplayer game is not selected, processing continues at processing block 2505. In processing block 2504, for a multiplayer game, the game pad 107 displays a virtual lobby for chatting amongst other customers until a game starts or during a game. In processing block 2505, the game server 103 starts a timer for the large screen display regions and content, and updates status bar region 707. In processing block 2506, if this is a new session (e.g. start of day, after a movie finishes, all previous games/events have finished), then start up the selected game in the upper tri-mode 809 with a movie/advertisement in full width in the top horizontal portion of screen, and the lower portion of the screen split into two sections—top games offered and up-coming events. The status bar 707 notes in a scrolling marquee style the title of the next movie showing and a count down of time to go until start of the movie, or other status such as players/groups signing in and starting up of multimedia content. In processing block 2507, if other games are started, then the other games get displayed in smaller display regions of the large auditorium screen, such as lower quadrants (see FIGS. 7-8). When game server 103 timers expire or other games end and the current game persists past the other games due to paid players still being in the game, the display region of the large auditorium screen allocated to the persisting game may get promoted to being a larger display region (e.g. growing left, growing right, filling the width or height of the screen, or filling the whole screen). Otherwise, if games end due to players dropping out of the game, the movie starts, or the paid time expires, the display regions allocated to the expiring games may be deleted to allow other display regions to be promoted space-wise or new games be started. In decision block 2513, the system checks to determine if it is time to show a movie on the large screen in this auditorium. If it is time to show a movie on the large screen, processing continues at processing block 2511. Otherwise, processing continues at processing block 2509. In processing block 2509, the large auditorium screen is allocated to games and/or promotions prior to the start of a movie. As described above, the large screen can be split into various display regions as new games begin or current games expire. In decision block 2510, game server 103 determines if each of the current games can continue to be played. This determination is based on whether players have paid sufficient credit for the game. Players who have paid for sufficient game time beyond the current session are allowed to keep those player session streams with possible splitting of display regions for other games. Players who have not paid for sufficient game time are not allowed to continue playing the game and the game stream is terminated. Game play continues for paid sessions. In processing block 2511, the movie is ready to begin so all display regions on the large auditorium screen merge back and just the movie shows on the large screen as normal. In processing block 2512, if there are no paid sessions, all display regions revert back to a pre-selected default display region configuration.

Figure 26:
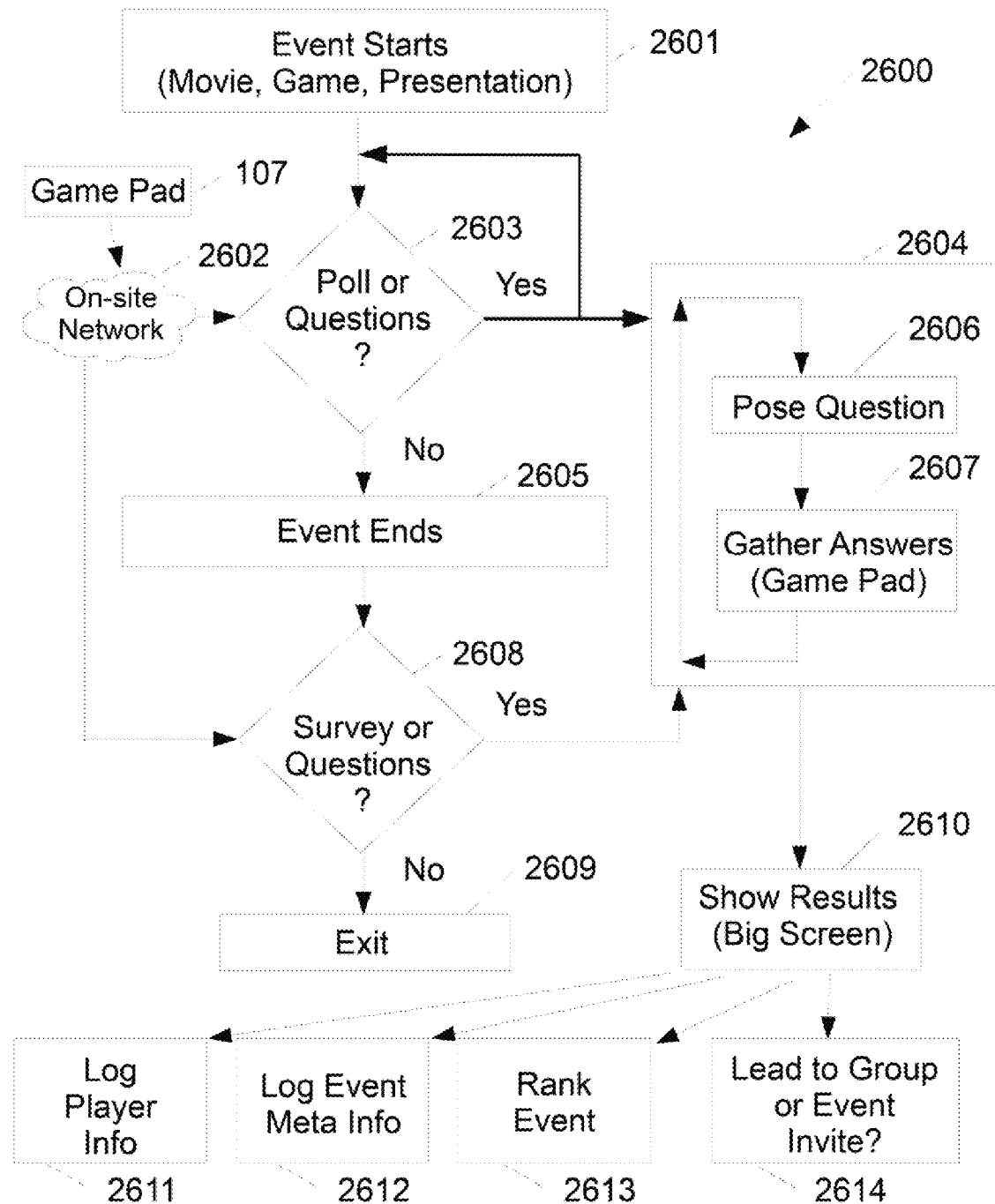
FIG. 26 illustrates a process for polling, and prompting for answers to questionnaires and ratings 2600.

FIG. 26 illustrates a process for polling, and prompting for answers to questionnaires and ratings. As described in a particular embodiment, requesting customer feedback on events, such as movies and games, allows for recommendations, based in part by audience statistics and profiles, as well as historical profiling based on attendance, event/sales causality and customer/group involvement. Game player activity during advertisements as well as limited time offers or reward based behavior may lead to benefits for event content/scheduling as well as higher revenues from advertisers targeting their market demographics and profiles. In processing block 2601, an event starts (e.g. Movie, Game, Presentation). Wired/wireless network data traffic can be received from game pads 107 via the on-site network 2602 described above. In decision block 2603, customers are prompted to participate in a poll or questionnaire during an event. If customers choose to participate during the event, processing continues at processing block 2604. In decision block 2603, processing loops back to decision block 2603 for each question in the poll or questionnaire. In processing block 2604, a question or other input may be presented to event participants (processing block 2606) and related answers are gathered, for example via the game pad 107 (processing block 2607). In processing block 2606, the game pad 107 may display a poll or survey question. In processing block 2607, input from customers/players is obtained from their game pad 107. In processing block 2605, the event ends, which may trigger an end survey or rating questions. In processing block 2608, customers are prompted to participate in a post-event survey or questionnaire after an event. If customers choose to participate after the event, processing continues at processing block 2604 where questions are asked and answers are obtained. In processing block 2609, if a customer wishes to skip the poll/survey, then game pad 107 may automatically log them out, perhaps based on their schedule. In processing block 2610, poll or survey questions may be shown on the large shared auditorium screen. In processing block 2611, the theater access server 101 logs customer/player information received from game server 103. This customer/player information can include paid attendance, game pad usage, product/service purchases, game purchase/usage, poll/survey information from the customer/player, profile information provided by the customer/player, and related customer-specific information. This customer/player specific information can be transferred to web access/content servers 301 for aggregation with other user information and use in better targeting content, advertising, and promotions for specific audiences. In processing block 2612, event meta information is also logged and transferred to theater access server 101 and to web access/content server 301. This event-specific information can include paid attendance, game pad usage, and poll/surveys submitted. In processing block 2613, the event is ranked based on survey results and the ranking is sent to theater access server 101 and web access/content server 301. Further, the event is categorized under both customers/players and groups. In processing block 2614, game pad 107, kiosk 603, or a conventional text message may be used to invite event participants to join a group, if they hosted the event and have set up such, provided that members profiles allows such action.

Figure 27:
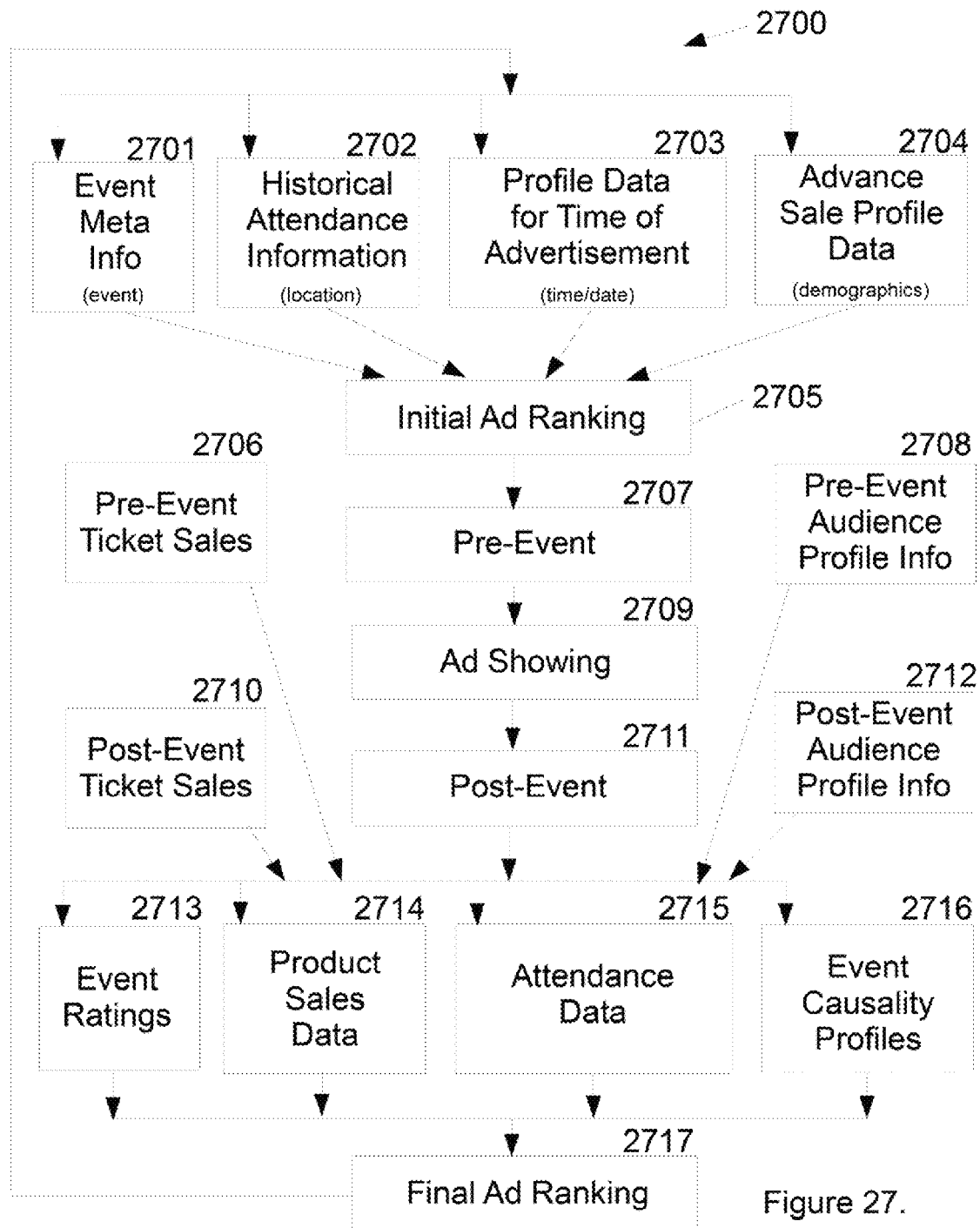
FIG. 27 illustrates a process for advertising and advertisements 2700.

FIG. 27 illustrates a process for advertising and advertisements. As described in a particular embodiment, advertisement can be driven both by normal means as event/location schedule and content information, but also using advanced business analytical methods that profiles customers in terms of choices offered, actions taken, affiliation or influence, in a feed back manner allowing both historical as well as predicted results expected. In processing block 2701, event meta information such as scheduled time, location and topic can lead to an initial advertisement ranking. In processing block 2702, Historical event attendance information (both regular "guest" ticket sales and member ticket sales) can also lead to an initial advertisement ranking. In processing block 2703, both member and group profile data (e.g. comparing to similar data previously, such as time slot, location, content type) can also lead to an initial advertisement ranking. In processing block 2704, advance sale profile data can also lead to an initial advertisement ranking. In processing block 2705, the system generates a range of initial advertisement rankings based on content, time, and location. In processing block 2706, pre-event ticket sales information (e.g. attendance numbers for games leading to movie ticket sales, etc.) can be used to rank an advertisement. In processing block 2707, a pre-event occurs, such as a trailer or games before a movie. In processing block 2708, pre-event audience profile information (such as member profile information or group details) may influence future advertisements scheduled, such as advertisements between this event and the next event. In processing block 2709, the advertisement is shown. In processing block 2710, post-event ticket sales information (number, interval of actual sales, location/method of sale, etc.) leads to a refinement of the historical event advertisement correlation. In processing block 2711, a post-event occurs. In processing block 2712, post-event audience profile information is also used for tracking actual attendance metrics. In processing block 2713, Theater Access Server 101 and remote web access/content servers 301 update databases with sales data. In processing block 2714, Theater Access Server 101 and remote web access/content servers 301 update databases with event ratings. In processing block 2715, Theater Access Server 101 and remote web access/content servers 301 update databases with attendance data. In processing block 2716, Theater Access Server 101 and remote web access/content servers 301 update databases with advance sales profile data. In processing block 2717, the initial advertisement ranking is compared with other initial rankings for analytical modeling.

Figure 28:
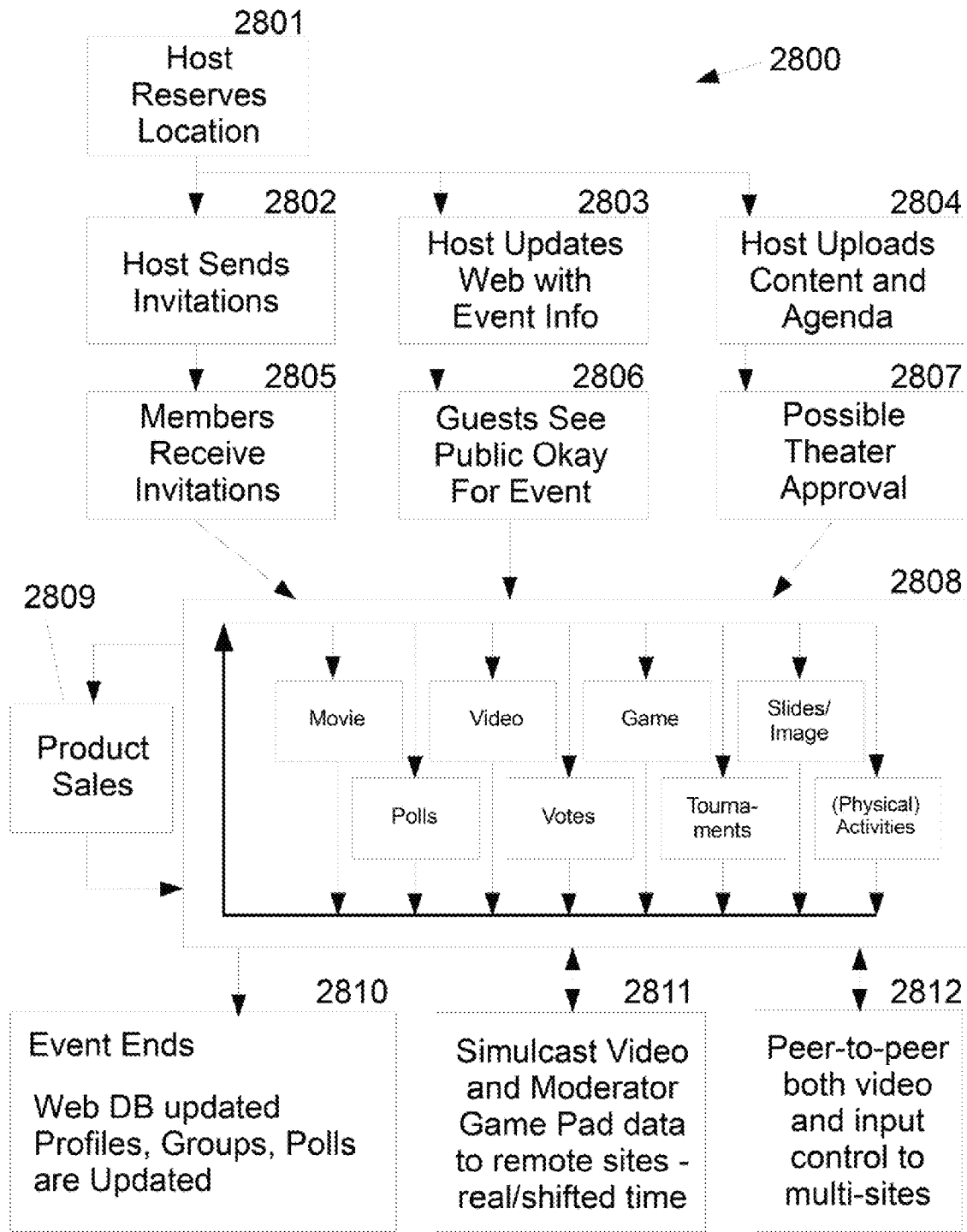
FIG. 28 illustrates a process for handling general events 2800.

FIG. 28 illustrates a process for handling general events. As described in a particular embodiment, a paid member or member group may be allowed to host an event in a theater like environment with wireless/wired game pads to present information to attendees and to receive feedback in real-time from the attendees. Various embodiments provide a convenient and efficient forum for conducting, for example, polls/surveys or focus groups. Various embodiments can enable educational, technical, or governmental activities/events to occur with the means to gather participant information, individual/aggregate responses, and attendee feedback. The described system provides an efficient means of conducting certification, tests or steering governmental bodies in future directions. This is possible due to the features and capabilities of the various embodiments described herein to display shared information on an auditorium screen while displaying personal/confidential information on secure game pads 107. Further, the many game pad 107 input mechanisms described herein, including user environment (sensor input) sensors and physical location sensors provide support for ad-hoc, mobile environments and related events. In processing block 2801, a host (member or group) reserves an auditorium screen location and time for an event, filling in details such as event name, description, hosting group (member), URL, keywords, cost, duration, pre-requisites, objectives and possible take away. In processing block 2802, the host sends out invitations to proposed attendees (e.g. via messages to group members "inbox", phone SMS text messages, or email, RSS feed, etc.). In processing block 2803, the host updates the web (e.g. a website or blog) with event information. In processing block 2804, the host uploads, through a web-connected PC, event content and event agenda. In processing block 2805, proposed attendees and/or members (i.e. guests) receive invitations to the event. In processing block 2806, guests can search or view the event schedule (e.g. as made available at a host website), if the event is marked as a public event, perhaps joining a member group if required. In processing block 2807, Theater Management may require prior approval for the event (agendas) before the event is actually scheduled/visible. In processing block 2808, the event begins at the theater location/time, possibly using split screens of images, videos, presentations, games, polls, surveys, tournaments, and the input devices from game pads 107 as described above. The event may also span multiple locations either via simulcast or via a fully interactive two-directional data feed. In processing block 2809, game pads 107 can run applications such as product/service ordering to theater concession terminals 604 as described above. Additionally, game pads 107 can be used to alert auditorium management to report audio/visual quality, audience disturbances, or other issues. In processing block 2810, when the event ends, the theater access server 101 and web access/content server 301 update their databases on profiles of participants (member and group levels), polls and surveys/tests, where some data may be returned (aggregate) to a event host organizer. In processing block 2811, one or more event multimedia streams (e.g. video, recorded sounds) may be transmitted to remote location in a simulcast fashion for other sites to (passively) observe content (such as a technical/educational seminar or lab). In processing block 2812, event multimedia stream(s) may be sent in peer-to-peer communication to other auditorium(s) on-site or off-site to enable two or more auditorium sites to collectively participate in event content.

Figure 29:
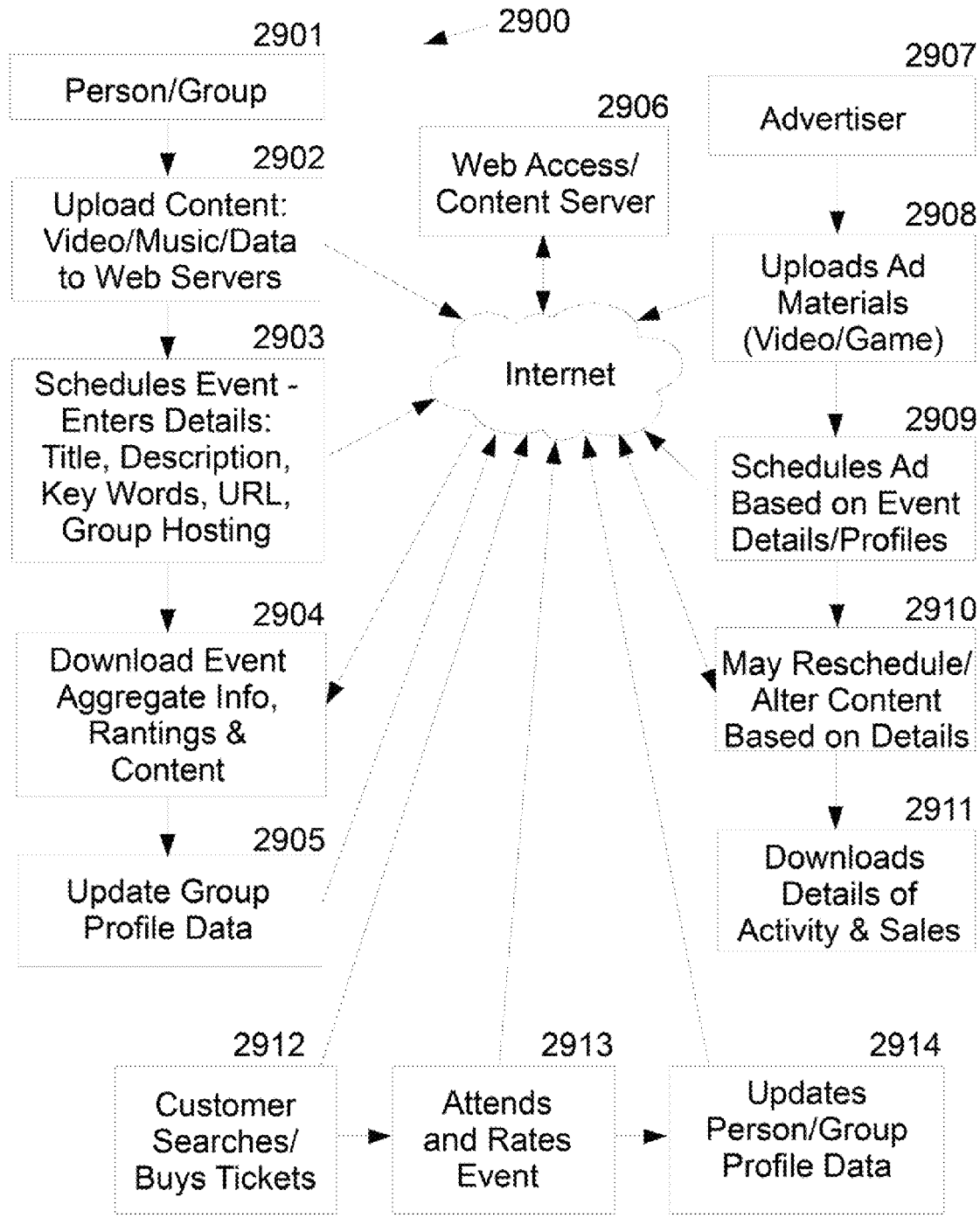
FIG. 29 illustrates a process for content upload/download 2900.

FIG. 29 illustrates a process for content upload/download. As described in a particular embodiment, the system enables a person or group to upload/download content in an efficient manner for public presentation/interaction, to collect survey or polled information, to optionally charge participants, to gather (aggregate) attendance information, and to advertise this event with group affiliation where attendees can both rank and rate content. In processing blocks 2901 and 2902, a person or group can upload content such as images, videos, games or data to web access/content server 301 for an event. In processing block 2903, a host can schedule an event by entering details such as title, description, key words, URL, name of group hosting event, cost and setting public or group only admittance. In processing block 2904, after an event occurs, an authorized person or group can download event data, such as ratings, surveys/tests, and content if modified. In processing block 2905, web access/content server 301 updates group profile data based on sales and participation data from theater access server 101, which includes participant ratings and comments. In processing block 2906, web access/content server 301 hosts content for events and pushes that data to theater sites that have events scheduled. In processing blocks 2907 and 2908, an advertiser can upload advertisement materials (e.g. images, video, presentations, game application data, and the like). In processing block 2909, the advertiser can schedule the advertisement based on event details, schedules and ranking or cost basis. In processing block 2910, the advertiser may reschedule an advertisement based on real time metrics, such as ranking changes (e.g. attendance, pre-event ratings, etc.). In processing block 2911, after the event and corresponding advertisement(s) run, the advertiser downloads (aggregate) details of the event activity, plus sales information (if product/service was on site or an event prerequisite). In processing block 2912, customers can search and buy event tickets from the web, box office 602 or kiosk 603. In processing block 2913, the customer attends and possibly rates the event. In processing block 2914, after attending an event, theater access server 101 and web access/content server 301 update member and associated group profile details.

Figure 30:
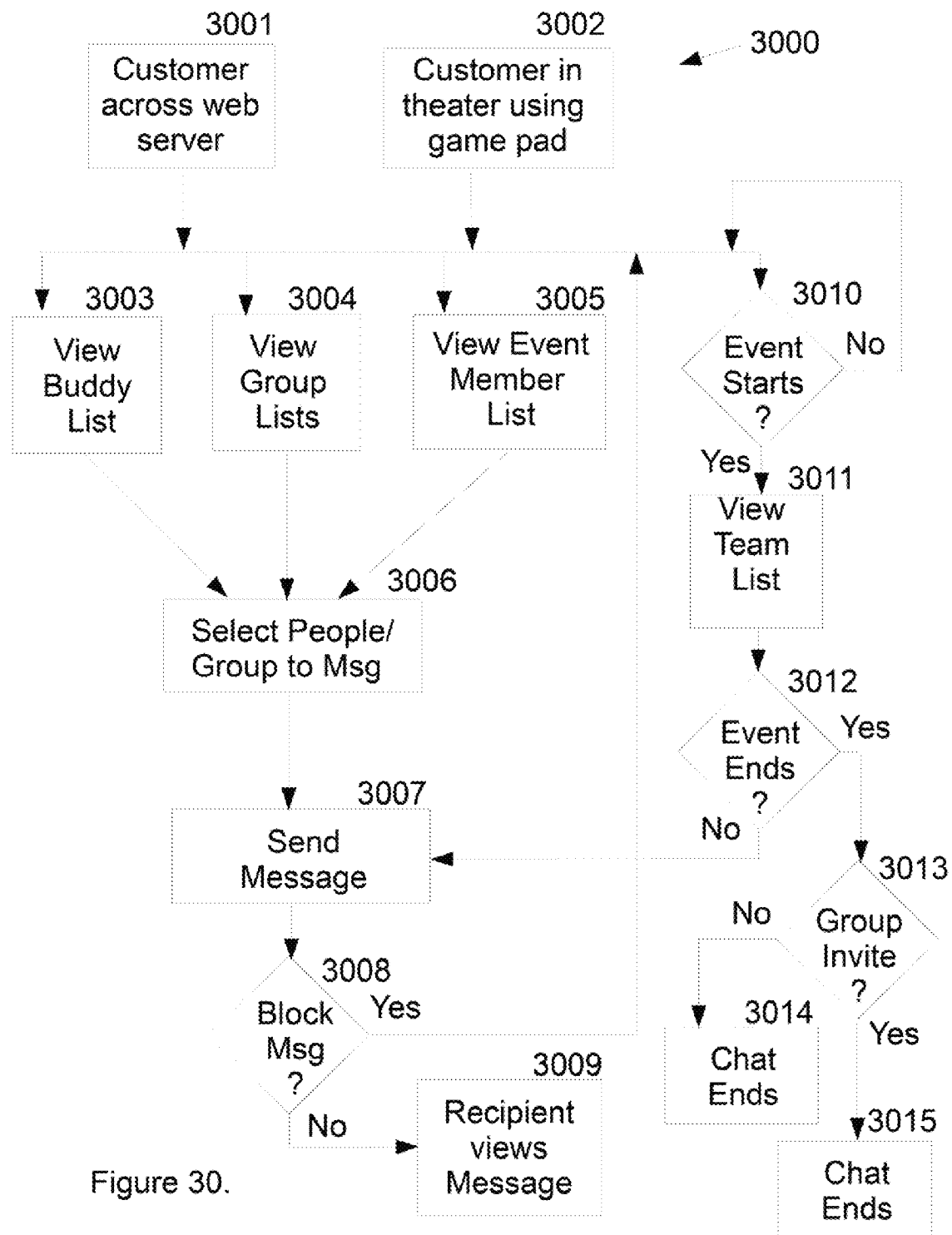
FIG. 30 illustrates a. process for player chat (wireless/wired) 3000.

FIG. 30 illustrates a process for player chat (wireless/wired). As described in a particular embodiment, the system enables customers (e.g. players at a gaming event) to search for buddies or group members, send messages to individuals, groups or team members during game play from a wired/wireless game pad device 107 that may involve sending messages across a network, such as the Internet to remote theater sites. The method also queues up messages for participants who have not arrived at an event yet. In this case, the absent participants appear as ghosts in a computer-generated virtual space until the absent participants arrive. Upon arrival, the participants may receive and scroll through received messages for possibly sending response messages. In processing block 3001, a remote customer can access the system via the web from a remote theater location. The remote customer can perform several functions while remotely connected. In processing block 3002, a local customer in attendance at a theater site hosting a game session using a game pad 107 can perform several functions while locally connected. In processing block 3003, local or remote customers can view buddy list members. The state of members on the buddy list may be off-line, absent, on-line, or busy. The buddy list is typically based on the member logged into the game pad 107. Member profiles control whether others can view specific information in general or by event. In processing block 3004, local or remote customers can view group list(s). The state of group members may be off-line, absent, on-line, or busy. Groups are searchable by group name, description, and key words. Group properties can control view specific information in general, by event type or keywords or by viewer member/group affiliation. In processing block 3005, local or remote customers can view event list members. The event list member state may be off-line, absent, on-line, or busy. Event members may control viewability permissions based on event, member attempting view, group hosting event, or group affiliation attempting view. In processing block 3006, the customer or player, after logging into the game pad 107, can then select a member or group members to whom a chat message can be sent. In processing block 3007, a chat message is sent from the game pad 107 (e.g. via RF communication devices if wireless as described above) to game server 103. If the location dictates, the chat message can be sent on to theater access server 101, web access/content server 301 and back down to a remote site theater access server 101, game server 103, and finally to the remote member's game pad 107. In decision block 3008, the game servers 103 (either local or remote site) can block messages depending on a (remote) member's privacy settings. In processing block 3009, if the recipient has not blocked the messages, the message can show up in the receiving member's lobby application (i.e. computer-generated virtual space) on the game pad 107 on which the receiving member is logged in. In decision block 3010, if an event starts, then in processing block 3011, the viewing game team member list is available to search for sending member messages. In decision block 3012, when an event (e.g. game session) ends, then the team list discontinues and messages are sendable on a member to member basis only. In decision block 3013, after an event has ended, the group (e.g. officer/administrators for the group) may send out group invites or messages to attendees. In processing block 3014, if a member blocks group invites or a group hosting event message, then the group invite message is not sent to that member. In processing block 3015, if the member does not block group invites or group hosting event messages, then a group invite may be sent to the member and the member receiving the invite may respond (if not already in the group hosting event).

FIGS. 9-15 show a diagrammatic representation of a machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server, if described herein as such, or a client machine in server-client network environment, or as a peer machine in a peer-to-peer (or distributed) network environment. The machine may be a personal computer (PC), a tablet PC, a set-top box (STB), a Personal Digital Assistant (FDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The software executed by these machines may be resident in the machine or transmitted or received over a network via network interface devices utilizing any one of a number of well-known transfer protocols (e.g., HTTP). Storage device 905 or 1511 can be used as a machine-readable storage medium for the storage and retrieval of software implemented with the various embodiments described herein.

While the machine-readable storage medium described herein is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Thus, computer-implemented systems and methods for providing interactive content for multiple networked users in a shared venue have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a server including a processor;
a display system in communication with the server, the display system including a shared screen to display a shared portion of a common event; and
a plurality of remote devices, respective remote devices comprising a display device and one or more inputs for receiving command selections from a user, respective remote devices transmitting received command selections to the server, the command selections affecting the shared portion of the common event, respective remote display devices displaying a personal portion of the common event, the personal portion not being displayed on the shared screen, respective remote devices further configured to directly transmit messages to other remote devices of the plurality, without notifying the server.

2. The system as claimed in claim 1 wherein one of the remote devices is configured to display a promotion to the user.

3. The system as claimed in claim 1 wherein the server is configured to access a web/access content server to authenticate one of a product transaction and a service transaction.

4. The system as claimed in claim 1 further including:
a theater access server in data communication with the server; and
a theater concession terminal in data communication with the theater access server to respond to product/service requests from one of the remote devices.

5. The system as claimed in claim 1, wherein one or more of the plurality of remote devices are in wired data communication with the server, and another one or more of the plurality of remote devices are in wireless data communication with the server.

6. The system as claimed in claim 1 wherein one of the remote devices includes a video input for receiving a video, a processor for processing the video, and a video output for displaying the processed video to a user.

7. A system comprising:
a server including a processor;
a display system in data communication with the server, the display system including a shared screen to display a shared portion of a common event; and
a plurality of remote devices in communication with the server, respective remote devices comprising a display device displaying a personal portion of the common event, respective remote devices further comprising a local application, the local application processing the personal portion of the common event, respective remote devices further comprising one or more inputs for receiving command selections from a user, respective remote devices transmitting the command selections to the server, the command selections affecting the shared portion of the common event, respective remote devices configured to transmit messages to other remote devices without notifying the server, respective remote devices being configured to initiate a display of other content, the server application triggering the display of the other content.

8. The system as claimed in claim 7, wherein one or more of the remote devices are in wired data communication with the server.

9. The system as claimed in claim 7 wherein the other content comprises a movie.

10. The system as claimed in claim 7 wherein the other content comprises an advertisement, the advertisement based on the personal portion of the common event.

11. The system as claimed in claim 7 wherein the content comprises an advertisement, the advertisement based on personal information.

12. The system as claimed in claim 7 wherein one or more of the remote devices are configured to join a group.

13. The system as claimed in claim 7 wherein the server retains profile information for users of the remote devices.

14. The system as claimed in claim 7 wherein one or more of the remote devices are configured to display a split screen image on the shared screen, a first split screen portion displaying the shared portion of the common event, and a second split screen portion displaying the other content.

15. The system as claimed in claim 14, wherein the content is another common event.

16. The system as claimed in claim 7 wherein one or more remote devices are configured to display a split screen image on the shared screen, a first split screen portion displaying the shared portion of the common event, and a second split screen portion displaying another shared portion of another common event.

17. The system as claimed in claim 7 further including:
a theater access server in communication with the server; and
a kiosk in communication with the theater access server, the kiosk including functionality to process profile information for users of the remote devices.

18. The system as claimed in claim 7 wherein one or more of the plurality of remote devices includes a video input for receiving a video image, a processor for processing the video image, and a video output for transferring the processed video image to a user.

19. A system comprising:
a server including a processor;
a display system in communication with the server, the display system including a shared screen to display a shared portion of a common event; and
a plurality of remote devices, the remote devices comprising a display device and one or more inputs for receiving command selections from a user, the remote display devices displaying a personal portion of the common event, the remote device transmitting received command selections to the server, the command selections affecting the shared portion of the common event, the remote devices further configured to directly transmit messages to other remote devices of the plurality, without notifying the server.

20. The system of claim 19, wherein the server comprises a game server, the plurality of remote devices comprise game pads, respective users of the remote devices using the game pads to play a game.

* * * * *